United States Patent
Da Costa Martins et al.

(10) Patent No.: US 12,099,013 B2
(45) Date of Patent: Sep. 24, 2024

(54) CALIBRATION METHOD OF A SPECTROSCOPY DEVICE COMPRISING A PLURALITY OF SENSORS AND OF TRANSFER OF SPECTRAL INFORMATION OBTAINED FROM AT LEAST TWO CALIBRATED SPECTROSCOPY DEVICES

(71) Applicant: Inesc Tec Instituto De Engenharia De Sistemas De Computadoras, Tecnologia E Ciência, Oporto (PT)

(72) Inventors: Rui Miguel Da Costa Martins, Oporto (PT); Pedro Alberto Da Silva Jorge, Oporto (PT)

(73) Assignee: INESC TEC INSTITUTO DE ENGENHARIA DE SISTEMAS DE COMPUTADORES, TECNOLOGIA E CIÊNCIA, Oporto (PT)

( * ) Notice: Subject to any disclaimer, the term of this patent is extended or adjusted under 35 U.S.C. 154(b) by 541 days.

(21) Appl. No.: 17/417,145

(22) PCT Filed: Dec. 20, 2019

(86) PCT No.: PCT/IB2019/061193
§ 371 (c)(1),
(2) Date: Jun. 22, 2021

(87) PCT Pub. No.: WO2020/136529
PCT Pub. Date: Jul. 2, 2020

(65) Prior Publication Data
US 2022/0074863 A1 Mar. 10, 2022

(30) Foreign Application Priority Data

Dec. 27, 2018 (PT) .......................................... 115234
Dec. 28, 2018 (EP) ..................................... 18248269

(51) Int. Cl.
*G01N 21/71* (2006.01)

(52) U.S. Cl.
CPC ..... *G01N 21/718* (2013.01); *G01N 2201/127* (2013.01); *G06F 2218/02* (2023.01); *G06F 2218/08* (2023.01); *G06F 2218/14* (2023.01)

(58) Field of Classification Search
CPC ............ G01N 21/718; G01N 2201/127; G06F 2218/08; G06F 2218/14; G01J 3/36
See application file for complete search history.

(56) References Cited

U.S. PATENT DOCUMENTS

2011/0037975 A1   2/2011   McClure
2013/0048852 A1*  2/2013   Verenchikov ........... H01J 49/22
                                                          250/282

(Continued)

FOREIGN PATENT DOCUMENTS

WO          0071980 A1     11/2000

OTHER PUBLICATIONS

Bristow et al. "Model Based Wavelength Calibration for CRIRES" Observatory Operations: Strategies, Processes, and Systems, edited by David R. Silva, Rodger E. Doxsey, Proc. of SPIE vol. 6270, 62701T, (2006) (Year: 2006).*

*Primary Examiner* — Manuel A Rivera Vargas
(74) *Attorney, Agent, or Firm* — Rivka Friedman

(57) ABSTRACT

The present invention is enclosed in the area of calibration of spectral information/spectroscopy devices, such as the calibration of spectral information which consist of high-resolution electromagnetic spectra, as Laser-induced Breakdown Spectroscopy (LIBS). It is an object of the present invention a calibration method of a spectroscopy device comprising a plurality of sensors and a method for transferring spectral information obtained from a first and a second spectroscopy devices. The method of the present invention provides the access to accurately defined spectral lines from the electromagnetic spectrum, as well as to obtain electromagnetic spectra in two different sites, with two different (Continued)

spectroscopy devices and physical samples still provide for the reliable comparison between the electromagnetic spectra obtained in each of such spectroscopy devices.

12 Claims, 5 Drawing Sheets

(56) References Cited

U.S. PATENT DOCUMENTS

2017/0092476 A1\* 3/2017 Duchoslav ............. G16C 20/90
2017/0146401 A1\* 5/2017 Antila ....................... G01J 3/45

\* cited by examiner

CALIBRATION METHOD OF A SPECTROSCOPY DEVICE COMPRISING A PLURALITY OF SENSORS AND OF TRANSFER OF SPECTRAL INFORMATION OBTAINED FROM AT LEAST TWO CALIBRATED SPECTROSCOPY DEVICES

FIELD OF THE INVENTION

The present invention is enclosed in the area of calibration of spectral information, such as the calibration of spectral information/spectroscopy devices—one or more electromagnetic spectra—which consist of high-resolution electromagnetic spectra, as electromagnetic spectra obtained by means of Laser-induced Breakdown Spectroscopy (LIBS). The present invention also provides for the transfer of spectral information obtained in two calibrated spectroscopy devices, spectral information obtained in a calibrated spectroscopy device being comparable with spectral information obtained in the other calibrated spectroscopy device.

PRIOR ART

Several high-resolution spectroscopy techniques are known in the art, such as Plasma emission spectroscopy, in particular Laser Induced Breakdown Spectroscopy (LIBS), Mass Spectroscopy (MS), X-Ray Fluorescence (XRF) or Nuclear magnetic resonance spectroscopy (NMR). High-resolution spectroscopy techniques provide high-resolution electromagnetic spectra with at least a picometer resolution.

The identification of chemical elements, molecules and their structure could be performed by direct spectral matching as obtained from such techniques against certified databases (Kramida et al., 2018), if infinite optical resolution and no uncertainties exist due to quantum, Doppler and collisional broadening and optical resolution. In real world however, spectral information obtained from a physical sample is the result of complex super-position and convolution of the previous physical phenomena, generating multi-scaled interference of spectral information due to optical resolution limits and spectral lines broadening effects.

These broadening effects and artefacts make it nearly impossible to validate the assumption that all spectral lines of a pure elements are exclusive information that allows a direct identification. In this context, line matching algorithms at optical resolutions are likely to fail element identification. Such is a very significant limitation for such high-resolution spectroscopy techniques, because many elements have significant number of overlapping band regions, as they have an elevated number of lines that may interfere with other elements.

Referring specifically to LIBS, as an example, state-of-the art plasma-emission spectroscopy systems work with pixel-based methods. These have limited success, because convoluted spectral bands do not allow a deterministic identification of constituents present in a physical sample by their spectral lines. During this process, unnecessary interference and uncertainty is introduced, constraining pixel-based methods to probabilistic identification, classification and quantification. Furthermore, today's methods cannot resolve spectral line doublet or the existence of isotopes, as these lines are generally convoluted below the optical resolution. The same is true for extracting plasma breakdown information, because peak broadening and spectrometers integration time force the information about electronic transitions to be both super-imposed and convoluted in wavelengths and time dimensions.

The same effects can be observed in other high-resolution spectroscopy techniques, except in that each sensor does not consist of a charge-coupled device (CCD), therefore forming a pixel, instead containing other forms of binning of information in the respective detectors.

Still in the example of LIBS, the full potential of such technique is provided by the interpretation of the dynamical information structure of emission lines acquired during the molecular breakdown ionization process, whereby each different constituent has a spectral fingerprint. This dynamical 'fingerprint' contains all the information about chemical elements and/or their isotopes, molecules and/or their conformations, states and structure present in a physical sample. The plasma emission is typically used in the analysis of complex samples/mixtures of substances, either occurring in nature or man-made.

The mentioned drawbacks of current techniques mean that the capability of state-of-the-art methods to identify, quantify, and predict the composition of a physical sample is still highly dependent on previous knowledge by a human expert (Hahn and Omenetto, 2010), and the development of models for identification and quantification is dependent on providing a correct context to spectral line identification (Cousin et al., 2011).

The present solution innovatively overcomes such issues.

SUMMARY OF THE INVENTION

It is an object of the present invention a calibration method of a spectroscopy device comprising a plurality of sensors, the calibration method comprising the steps of:
i) obtaining an electromagnetic spectrum of a physical sample, the electromagnetic spectrum being obtained by means of the plurality of sensors of the spectroscopy device;
ii) obtaining, by determining peak groups of the electromagnetic spectrum within a wavelength interval from a plurality of predefined wavelength intervals, and matching each peak group with at least one theoretical spectral line within such interval, at least one spectral line group from the electromagnetic spectrum, a spectral line group containing at least one spectral line,
iii) optimising a deconvolution of each obtained spectral line group against at least one theoretical electromagnetic spectrum, and thereby extracting at least one spectral line from each spectral line group, in particular obtaining a wavelength associated to each extracted spectral line, preferably the optimisation being performed until convergence of each spectral line group with an at least one spectral line of a theoretical spectrum, with a predefined minimum error,
iv) assigning each obtained wavelength to one or more sensors of the plurality of sensors of the spectroscopy device, and thereby corresponding each wavelength to a wavelength position in the whole sensor length, the sensor length being defined by the plurality of sensors, and
v) from the correspondence of each wavelength to a wavelength position in the sensor length, determining a calibration function of the spectroscopy device.

Therefore, in comparison to the state-of-the art that is based on sensor-based technology (such as pixel-based, in the case of LIBS): the method of the present invention provides the access to accurately defined spectral lines, allows the deterministic assignment of observed spectral lines to their expected theoretical wavelengths and transition probabilities (Kramida et al, 2018). It allows to accurately obtain the calibration function of a spectroscopy device, therefore establishing the basis for transfer of spectral information obtained from different spectroscopy devices. In prior art systems, for the spectral information between two physical samples to be comparable, it requires that the same spectroscopy device is used. Moreover, and as will be described subsequently, and by accurately obtaining the calibration function of a spectroscopy device—as well as accurately defined spectral lines, the method of the present invention also establishes the basis for accurately defining consistently observed spectral lines to self-assemble resolution invariant spectral lines databases—in the case of LIBS, additionally using dynamic breakdown spectral information—and allowing the automated construction of distributed spectral lines databases, where the data is obtained from independent spectroscopy devices and providing a network of apparatuses containing databases with spectral information of the said spectroscopy devices, contributing for a common big data emission spectral lines database—in the case of LIBS, with plasma-breakdown information. Consistent observable lines means a match against the theoretical SAHA/LTE spectra both in terms of group rank position and their intensity, as will be described subsequently, the match being classified as perfect when within a minimum predefined error.

The method of the present invention changes the paradigm associated with prior art methods, by using only sub-optical spectral information, i.e., extracting spectral lines below the optical resolution of the spectroscopy device. Such is possible, because sensor density is higher than optical resolution, and spectral lines incident on each sensor are broadened through consecutive sensors (in the case of LIBS, CCDs). Therefore, determining a spectral line position—from such spectral information, avoids the uncertainty associated with sensor-based methods (pixel-based method, in the case of LIBS). Moreover, ultra-low wavelength error in spectral lines is relevant for extraction of constituent information for identification, classification, quantification and determining the chemical structure from the electromagnetic spectra. As regards a LIBS based method, extremely low error in the determination of spectral lines, turns the identification of elements or small molecules ion emission, a deterministic process, opposing to a probabilistic process in previous sensor-based methods, that is, identification models had to be based on uncertainty o spectral line sensor position.

Sub-optical spectral data is a consequence of the method disclosed herein to extract spectral lines with improved accuracy, enabling the identification of constituents in complex physical samples. Sub-optical resolution is the determination of spectral lines below the optical resolution of the spectrometer/spectroscopy device using super-resolution achieved by sub-optical continuous sensor calibration and deconvolution techniques to remove the convolution artefacts introduced by the components of the spectroscopy device—such as optical components, in the case of LIBS. Sub-optical spectral data is used as feature variables to identify and/or quantify one or more constituents in a physical sample.

As is clear from the above description, the method of the present invention may be implemented by an individual computational apparatus which obtains the electromagnetic spectrum and the information on the spectroscopy device, namely the sensor length, the apparatus not comprising the specific spectroscopy device itself. The computational apparatus may also comprise the spectroscopy device, although not required.

The referred theoretical electromagnetic spectrum may consist of a Saha/LTE emission spectrum, such as Saha/LTE emission spectra of particular elements, thereby providing consistency between the obtained electromagnetic spectrum and the theoretical electromagnetic spectrum.

A physical sample contains constituents, each constituent consisting of one or combinations of chemical elements and/or their isotopes, molecules and/or their conformations or states.

Provided the sub-optical calibration of the method of the present invention, it enables automatic self-assembly of spectral line databases by: i) performing supervised sub-optical deconvolution using theoretically consistent spectral lines; ii) digitally transferring sample spectral lines information across a network of computational apparatuses which may contain spectroscopy devices, maintaining the consistency of spectral lines wavelengths independently of spectral resolution and corresponding intensities; and iii) generating the distributed spectral lines database that can be used as the source of knowledge database across a network of spectrometer devices. By means of specific embodiments of the method of the present invention, it is possible to create distributed spectral information databases that can be further used by a multitude of different devices.

In an embodiment which will be subsequently described in detail, the method self-assembles spectral information databases from existing or new added data and self-diagnoses about the consistency of the spectral lines of an obtained electromagnetic spectrum with spectral information in such databases. It further provides to supervise which spectral lines should be used by using the theoretically consistent emission spectral lines.

The capacity of autonomous continuous update and interaction without human interpretation, is more and more necessary for applications in areas of complex variability, such as, geology, medicine and biotechnology; where big-data databases of high resolution spectroscopy techniques do not exist and validation by human labour is not feasible. The method of the present invention is thus a horizontal technology applicable to fields where minimally destructive and minimally invasive applications are mostly needed, such as: health-care, animal care, biotechnology, pharmaceuticals, food and agriculture, raw materials and minerals, micro and nanotechnology, molecular biology, inland security and military, chemical and nano-engineered materials. It does not require preparation of physical samples in a laboratory. The spectral information of the present method is preferably obtained from a technology which enables plasma inducement, namely LIBS.

Moreover, it is also an object of the present invention a method for assembling at least one electromagnetic spectrum database which comprises the steps of:
 calibrating a spectroscopy device through the method of any of the preceding claims,
 obtaining an electromagnetic spectrum of a physical sample by means of the plurality of sensors of the calibrated spectroscopy device,
 obtaining at least one spectral line from the electromagnetic spectrum of the calibrated spectroscopy device and determining one or more constituents present in such physical sample, and
 storing such at least one spectral line obtained from the electromagnetic spectrum X and corresponding determined one or more constituents Y in said at least one electromagnetic spectrum database, thereby assembling an entry corresponding to a sample.

Thus, the method of the present invention makes use of a high-resolution sub-optical electro-magnetic spectrum, obtained by the said latent thermodynamic equilibrium or/and dynamical emission spectra, to extract the correspondent spectral lines and determine their wavelengths by matching the line position in the continuous sensor length of the sensor wavelength calibration function. From the extracted spectral lines, consistent spectral lines are determined with a database, and may be classified into exclusive (lines that exist for a particular constituent), interference (lines that interfere with other lines from other constituents) and unique (spectral lines that are exclusive of a plasma-breakdown process and particular of a particular molecular structure). These consistent spectral lines may constitute the said assembled database, providing knowledge about constituents at a particular optical resolution.

It is yet an object of the present invention a method for transferring spectral information obtained from a first spectroscopy device i and at least a second spectroscopy device j, in a supervised fashion and in an unsupervised fashion. The particulars of such inventive aspects of the present invention are detailed below.

Furthermore, it is also an object of the present invention a computational apparatus for the calibration of a spectroscopy device comprising a plurality of sensors, wherein it is configured to implement the calibration method of the present invention or the assembly method of the present invention or the supervised and unsupervised spectral information transfer methods of the present invention, optionally further comprising a spectroscopy device which:

is able to induce a plasma state in a physical sample, said spectral information being obtained from said spectroscopy device, the spectroscopy device preferably consisting of a plasma inducing spectroscopy technique, more preferably a LIBS device, consists of an MS device, the sensors thereby consisting of at least one MS detector, consists of an XRF device, the sensors thereby consisting of at least one XRF detector, or consists of an NMR device, the sensors thereby consisting of at least one NMR detector.

Additionally, it is also a part of the present invention a network of computational apparatuses, each computational apparatus comprising a database and being configured to implement the database assembly method of the present invention, thereby assembling such database, each computational apparatus being further configured to implement the supervised and unsupervised spectral information transfer methods of the present invention wherein, for each computational apparatus, any sample entry obtained by means of a first spectroscopy device is comparable with any sample entry obtained by means of the second spectroscopy device. As referred, it provides the automated construction of distributed spectral lines databases, where the data is obtained from independent spectroscopy devices and providing a network of apparatuses containing databases with spectral information of the said spectroscopy devices, contributing for a common big data emission spectral lines database—in the case of LIBS, with plasma-breakdown information.

A non-transitory storage media including program instructions executable to carry out the calibration method, the assembly method and/or the spectral information transfer methods of the present invention, in any of their described embodiments, is also part of the present invention.

Synchronized samples (57)—samples that have spectra and compositional similarities, albeit not equal, covering a particular region of the feature-space. Such allows to create a global feature space (T) that can be used to diagnose information and accelerate the database development of new apparatuses with manufactured with null databases;

Chain of samples—samples from different apparatuses are neighbours in the feature space, and therefore, a network chain of devices can transfer information between consecutive feature-space regions, by supervised (58) or unsupervised steps (S62). Chain information transfer is performed between $X_1 \rightarrow X_2 \rightarrow X_3 \rightarrow \ldots \rightarrow X_n$, where $X_{i+2}$ is never synchronized with $X_i$. Allowing to transfer information of unknown regions of the feature-space of a particular apparatus, covering the feature-space of all apparatuses (T).

Figure 10:
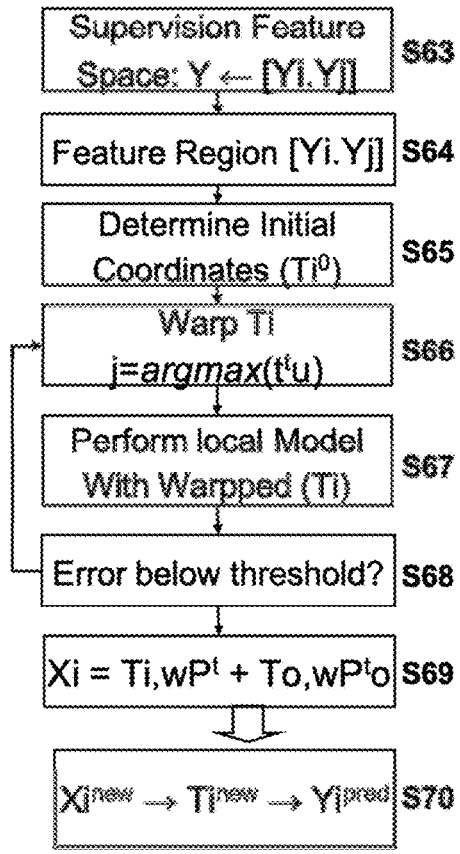
Figure 10:
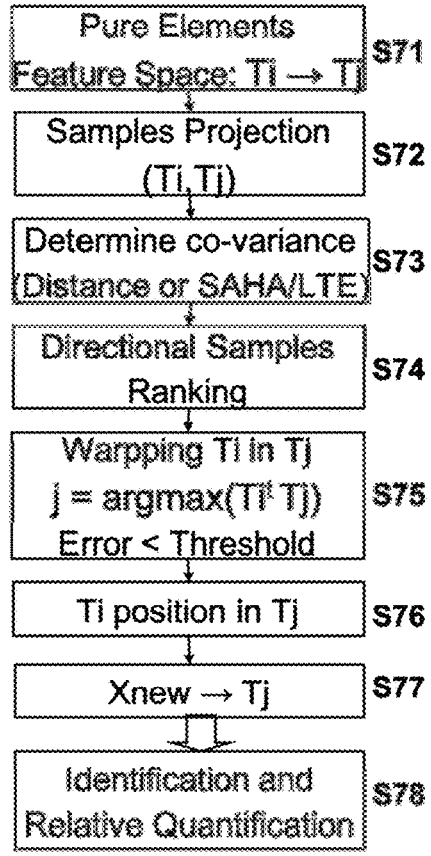

FIG. 10. presents auxiliary information about the main steps of both supervised and unsupervised spectral information transfer:

DETAILED DESCRIPTION

The more general and advantageous configurations of the present invention are described in the Summary of the invention. Such configurations are detailed below in accordance with other advantageous and/or preferred embodiments of implementation of the present invention.

In a preferred embodiment of the calibration method of the present invention, obtaining at least one spectral line under step ii) comprises:

binning each peak group of the electromagnetic spectrum, a peak group containing at least one peak, by determining peak groups of the electromagnetic spectrum within a wavelength interval from a plurality of predefined wavelength intervals and by comparing peak groups within such predefined wavelength intervals with spectral lines of a theoretical spectrum, wherein the number of peak groups of the electromagnetic spectrum and of the theoretical spectrum are the same, correcting the relative intensity of each binned peak group and defining a rank of each peak group according to a corresponding corrected intensity, said correction being performed by comparison with the intensities of corresponding theoretical spectral lines, and matching the rank of each peak group, by iteratively assigning a wavelength position of a peak group and corresponding a corrected intensity with at least one theoretical spectral line within such interval, and thereby obtaining one or more spectral line groups.

Such specific method provides a more reliable deconvolution in step iii), as peaks in the obtained electromagnetic spectrum are organised in peak groups, their intensity is corrected and the groups are ranked, thereby delivering one or more spectral line groups which allow to better identify spectral lines in the deconvolution of step iii).

In particular, the peak binning of step a) may further comprise performing wavelength distance clustering between the obtained peak groups and corresponding theoretical spectral lines, thereby determining peak groups of the electromagnetic spectrum within a wavelength interval.

Moreover, the comparison with the intensities of corresponding theoretical spectral lines of step b) may further comprise:

determine the number of spectral lines of the theoretical electromagnetic spectrum inside a peak group of the obtained electromagnetic spectrum, and if such peak group is centred in one or more sensors of the spectroscopy device, divide the energy of such peak group between the number of spectral lines of the theoretical electromagnetic spectrum, or, alternatively, if the peak group is convoluted along more than one sensor, determine the total energy of the peak group in such sensors and divide such total energy by the number of convoluted theoretical spectral lines, thereby correcting the relative intensity of obtained peak groups based on the corresponding theoretical spectral lines.

In another particular embodiment for obtaining at least one spectral line under step ii), the rank matching of step c) specifically comprises:

performing SS=n−k rank search sequences (SS), n consisting of the number of peak groups and k being an integer between 3 and n, with matching between peak groups of the obtained electromagnetic spectrum and spectral lines of the theoretical electromagnetic spectrum, sorting peak groups by their intensities until a global rank match is established, the global rank match being established when a full length is reached, thereby obtaining one or more spectral line groups, and where a peak group does not match in wavelength position and intensity with a spectral line of the theoretical spectrum, discarding such peak group, thereby providing a complete match between peak groups of the obtained electromagnetic spectrum and spectral lines of the theoretical electromagnetic spectrum. Discarding a certain peak group may be described as dropping such peak group, to provide a more complete match.

In another inventive aspect of the calibration method of the present invention, the deconvolution of step iii) may further comprise optimising the wavelength position and intensities of spectral lines within a spectral line group between each spectral line group and a theoretical electromagnetic spectrum, specifically by means of the optimisation of similarity and wavelength position invariance between each spectral line group and a theoretical electromagnetic spectrum and, preferably, such optimisation comprising the estimation of the wavelength position of theoretical spectral lines by deconvolution of the obtained electromagnetic spectrum (O) and convolution of the referred theoretical spectral lines (P) within a spectral line group, by non-negative optimization of:

$$j = \mathrm{argmin}(|O_{dec} - CP_{conv}^T|),$$

where C is a non-negative matrix which defines a convolution and superposition of spectral lines, $P^T$ consisting of the transposed of P. The deconvolution of the obtained spectrum (O)—thereby obtaining a deconvoluted O ($O_{dec}$)—and the convolution of the referred theoretical spectral lines (P)—thereby obtaining a convoluted P ($P_{conv}$)—are so optimised aiming a match between O and P, thereby extracting at least one spectral line. Such particular method provides a reliable way of deconvoluting spectral lines from a spectral line group.

The electromagnetic spectrum may be obtained by means of several techniques, preferably consisting of a high-resolution electromagnetic spectrum, such as an electromagnetic spectrum obtained by:
- a plasma inducing spectroscopy technique, preferably Laser-induced Breakdown Spectroscopy (LIBS), the spectroscopy device thereby consisting of a LIBS device and the sensors of CCDs,
- Mass Spectroscopy (MS), the spectroscopy device thereby consisting of a MS device and the sensors of at least one MS detector,
- X-Ray Fluorescence (XRF), the spectroscopy device thereby consisting of an XRF device and the sensor of at least one XRF detector, or
- Nuclear Magnetic Resonance Spectroscopy (NMR), the spectroscopy device thereby consisting of an NMR device and the sensors of at least one NMR detector.

Moreover, an electromagnetic spectrum may correspond to a physical sample with a highly complex composition, such as containing constituents which are unknown. For such a case, prior to step ii), the calibration method of the present invention may further comprise the steps of:
- project the obtained electromagnetic spectrum into a feature space F, the feature space F consisting of a multiple dimension vector space comprising spectral information on a plurality of physical samples, the spectral information comprising a one or more spectral lines having been extracted from a previously obtained electromagnetic spectrum and) corresponding to a plurality of known constituents, the spectral information on a plurality of physical samples being clustered in one or more groups in the feature space F, according to a predefined distance between such spectral information,
- determine a cluster group of the obtained electromagnetic spectrum and, in such cluster group, determine the spectral information most similar to the obtained electromagnetic spectrum,
- determine the known constituents corresponding to the most similar spectral information,
- obtain a theoretical electromagnetic spectrum from such determined constituents,
- define the obtained theoretical electromagnetic spectrum as the theoretical electromagnetic spectrum for steps ii) and iii).

Furthermore, an electromagnetic spectrum may be obtained from a spectroscopy device which contains more than one group of sensors, such as the case of a LIBS device with two CCDs. In such a case, in which the electromagnetic spectrum was obtained from a spectroscopy device comprising at least two groups of sensors, the calibration method of the present invention may further comprise the lengths of such at least two groups of sensors being merged after the assignment of step iv) and thereby obtaining a full sensor length, preferably the said merge comprising:
- re-ordering said at least two groups of sensors by their corresponding wavelength intervals;
- determining at least one wavelength interval common to the at least two groups of sensors, as well as the corresponding spectral lines inside the said at least one common wavelength interval;
- determining a relation between the lengths of the at least two groups of sensors by means of the said corresponding spectral lines directly, and
- merging two non-common wavelength intervals and said common wavelength interval, to obtain the full sensor length.

As previously referred, a highly relevant particular feature of the method of the present invention is related to the interpretation of the dynamical information structure of emission lines acquired during the molecular breakdown ionization process, whereby each different constituent has a spectral fingerprint. Such dynamic information may be identified and analysed where the referred obtained electromagnetic spectrum consists of a plurality of obtained electromagnetic spectra, in particular a plurality of obtained electromagnetic spectra which correspond to a variation in time, for a certain time-lapse wherein the electromagnetic spectrum from which at least one spectral line group is obtained in step ii), and thereby from which spectral lines are deconvoluted in step iii), consists of each of the plurality of obtained electromagnetic spectra, each corresponding to a certain time-instant from said time-lapse, thereby steps ii) and iii) being performed for each electromagnetic spectrum corresponding to a certain time-instant from said time-lapse, preferably the electromagnetic spectra being further obtained by a plasma inducing spectroscopy technique and the calibration method further comprising the following steps:
- extracting spectral lines correlated with a specific time-instant from said time-lapse,
- from said extracted correlated spectral lines, determining regions of interest in said time lapse, each region of interest corresponding to a time interval from said time lapse, the time interval specifically containing at least one of the extracted correlated spectral lines and thereby corresponding to the time of life of specific molecular breakdown ions from the physical sample,
- from said regions of interest, defining a temporal sequence of extracted correlated spectral lines, defining each ion as a node of a dynamic spectral information network, such network being established as unique spectral information related to a specific constituent or plurality of constituents present in the physical sample, and
- more preferably, storing such dynamic spectral information network and respective constituent or constituents in a database.

As previously mentioned, it is also an object of the present invention a method for transferring spectral information obtained from a first spectroscopy device i and at least a second spectroscopy device j. Such consists of another highly relevant feature of the present invention, as it allows to obtain electromagnetic spectra in two different sites, with two different spectroscopy devices and physical samples, and still provide for the reliable comparison between the electromagnetic spectra obtained in each of such spectroscopy devices. An example is that of different devices in different places and time, with access to different samples, such as several Mining machines, autonomous or remotely operated vehicles (ROV) in several locations of a mine, or even in different mines, acquiring spectral information on physical samples in such different locations, the physical samples consisting of rocks in such locations of the mine(s), and thereby identifying the constituents of such rocks by means of such spectral information. The method for transferring spectral information may be supervised or unsupervised. In the supervised version, it comprises the steps of:

assembling a first database with electromagnetic spectra obtained from the first spectroscopy device i, by means of the assembly method of the present invention, assembling at least one second database with electromagnetic spectra obtained from the at least one second spectroscopy device j, by means of the assembly method of the present invention, and concatenate a plurality of constituents $Y_i$ of the sample entries assembled in the first database with a plurality of constituents Y of the sample entries assembled in the at least one second database, thereby obtaining a composition space Y, perform a base transformation in the composition Y and thereby obtain a feature space K, in which $K=UC^T$, U consisting of a vector of a feature space of constituents and C of a base vector of K in which U is not maximised, and perform a base transformation in a composition X consisting of spectral information corresponding to the concatenated composition Y and thereby obtain a feature space F, where $F=TW^T$, W consisting of a feature space of spectral information and W of a base vector of F in which W is not maximised, wherein $$K_i = T_i Q_i^T + U_{o,i} Q_{o,i}^T$$

in which $T_i$ is a covariance feature space, $Q_i^T$ consists of a co-variance basis vector, and $U_{o,i}$ consists of orthonormal information vector of $K_i$, with $Q_{o,i}^T$ basis, and $$F_i = T_i P_i^T + T_{o,i} P_{o,i}^T$$

in which $P_i^T$ consists of a co-variance basis vector, and $T_{o,i}$ consists of orthonormal information vector of $F_i$, with $P_{o,i}^T$ basis, determine at least one region of common features in K, thereby obtaining a one or more common feature regions, preferably by means of clustering of sample entries in K, determine initial coordinates $T_{i \rightarrow j}^0$ by direct projection in the $T_j$ feature space, where $K_i = Q(Q^T Q)^{-1}$, coordinate warping by warping position $T_i$ in $T_j$, such that a co-variance $F^T K$ is maximised, until a prediction error is below a predefined threshold, therefrom reconstruct electromagnetic spectra $X_i$ in $X_j$, by means of inverse feature transformation of $F \rightarrow X$, thereby providing that any sample entry obtained by means of the first spectroscopy device is comparable with any sample entry obtained by means of the second spectroscopy device.

It is also an object of the present invention an unsupervised method for transferring spectral information, comprising the steps of:

perform the method of the previous claim, wherein the electromagnetic spectra obtained from the at least one second spectroscopy device and the electromagnetic spectra obtained from the first spectroscopy device are in respect of physical samples containing at least one pure element, project an electromagnetic spectrum obtained in the first spectroscopy device in the feature space F, such electromagnetic spectrum corresponding to a physical sample containing at least one unknown constituent, determine a direction of co-variance and a relative position at co-variance direction, using the initial coordinates $T_{i \rightarrow j}^0$, find an optimal position of initial coordinates $T_{i \rightarrow j}$ by warping along the co-variance direction, such that rank is ordered and co-variance between $T_{i \rightarrow j}$ and $T_j$ is maximised between i and j pure element samples, until the covariance is maximised, thereby providing a stable rank with [$T_{i \rightarrow j}$, $T_j$], and therefrom estimate one or more constituents present in the physical sample containing at least one unknown constituent.

Embodiments

In cooperation with attached drawings, the several embodiments of the objects of the present invention are herein described.

The several described embodiments are exemplary of specific implementations of the objects of the present invention, mainly with resort to the example in which the electromagnetic spectrum/spectra consist of electromagnetic spectrum/spectra obtained by means of a plasma inducing spectroscopy technique such as LIBS.

Figure 1:
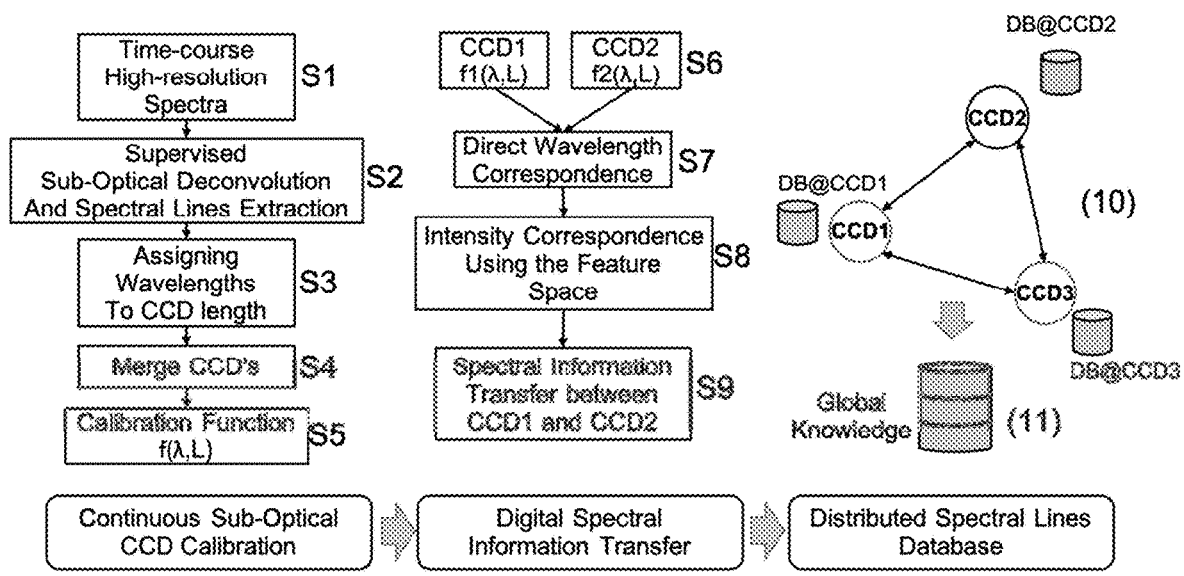
FIG. 1 contains a representation of an embodiment of the assembly method of the present invention, which enables to build the one or more (distributed) self-assembled spectral lines databases. In the first column, it presents a possible set of steps of the calibration method of the present invention, for a case of a spectroscopy device which contains two groups of sensors, which thereby require merge. The middle/second column presents a possible set of steps for the method of spectral information transfer between a first calibrated spectroscopy device (CCD1) and a second calibrated spectroscopy device (CCD2). The right/third column presents a network of databases, each containing spectral information obtained from a spectroscopy device, the network of databases defining a global knowledge database (knowledgebase). The remaining figures are for an illustrative case of electromagnetic spectrum/spectra obtained by means of LIBS.

Reference is made to FIG. 1, provide an overview of an embodiment of the calibration method of the present invention, as well as of an apparatus which implements such method.

Firstly, the method and system disclosed herein comprises continuous sub-optical CCD calibration. To achieve that a time-course plasma emission high-resolution spectra of a physical sample ($S_i$) is recorded (S1) and subjected to supervised sub-optical deconvolution (S2) to extract theoretically consistent spectral lines ($\lambda_i$) and assignment of the spectra lines wavelengths to the CCD length (L) (S3), with correspondent merge of CCD lengths and wavelengths in the case of multiple CCD devices (S4) to obtain the continuous calibration function $f(\lambda, L)$ (S5).

Secondly, it is also an object of the present invention a method for the transfer of spectral information between one spectroscopy device and at least one second spectroscopy device, such method comprising digital spectral information transfer whereby two or more CCDs (S6) calibrated with the calibration method of the present invention, thereby having known calibration functions, have direct wavelength correspondence (S7) and intensity correspondence using the local representative feature space method (S8) to piecewise perform all spectral information transfer between CCDs (S9).

Lastly, it is also an object of the present invention an assembly method, which enables to create distributed spectral lines database using independently recorded spectral databases (10) are converted inside a network of devices, allowing to create a global database (11) that can be shared with other apparatuses.

These objects are further detailed subsequently.

According to a preferred embodiment of the invention, the calibration method of the present invention, which may be referred to—within the terms of LIBS—as continuous sub-optical CCD calibration, is carried out using electromagnetic spectral information of a physical sample acquired by plasma emission spectroscopy. The said electromagnetic spectral information taken to a physical sample $S_i$, is recorded for a given set of conditions: laser energy and pulse function, wavelengths, atmospheric composition, pressure and temperature; as well as, samples with complex composition.

Figure 2:
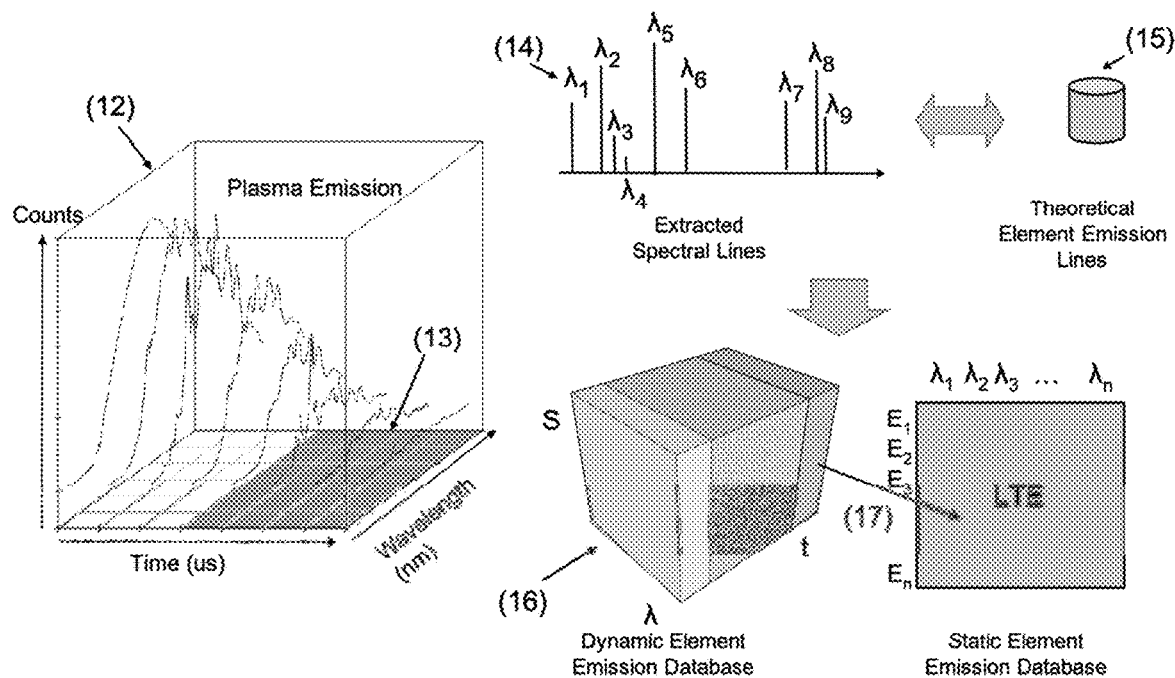
FIG. 2 (left) presents a typical dynamical LIBS signal (12) that encompasses a time series from laser ablation to ion emission at the latent thermodynamic equilibrium (LTE) (13), and corresponding main steps (right) for assembling sub-optical dynamic emission spectral lines. Such is performed by sub-optical spectral lines extraction from sample emission spectra (14) that are consistent with theoretical ion emission lines (15). The extracted emission lines (A) along time (t), comprising the dynamic emission databases D(S, $\lambda$,t) (16), from which data at the LTE can also be extracted (17).

Such embodiment starts with the acquisition of time-course high resolution spectra (S1). A LIBS signal will be used as an example as depicted in FIG. 2. A typical LIBS signal that encompasses a dynamic emission constituted by a time series (12) from laser ablation, plasma expansion with molecular breakdown and ionization, plasma cooling, electron decay, to the ion atomic emission at the latent thermodynamic equilibrium (LTE) (13). For each sample $S_i$, spectrum intensity is recorded at different wavelengths ($\lambda$) along time (t) (14). When LIBS spectra corresponding to a plurality of physical samples S are recorded (15), these are stored in a 3-way tensor (L) with dimensions S, $\lambda$, t (16) and corresponding LTE spectral lines (17).

Results from dynamic emission are therefore processed for sub-optical spectral lines extraction (Ai) (14) using supervised sub-optical deconvolution (S2) and analysed for consistency metrics against the expected theoretical element emission lines (SAHA/LTE emission spectra) stored in a database (15).

Supervised sub-optical deconvolution (S2) is used to accurately extract the spectral lines ($\lambda$i) (14). Such is performed by optimizing the deconvolution against the expected theoretical SAHA/LTE emission spectra of a particular element, so that both are consistent (15). Consistent emission lines databases are stored in the tensor format D(S, $\lambda$,t), constituting the dynamical spectral emission lines database (16), for a given set of laser energy and pulse function, wavelengths; atmospheric composition, pressure and temperature. A subset from D(S, $\lambda$,t) can be obtained for emission lines at the LTE (17), a static version of the emission lines database.

Figure 3:
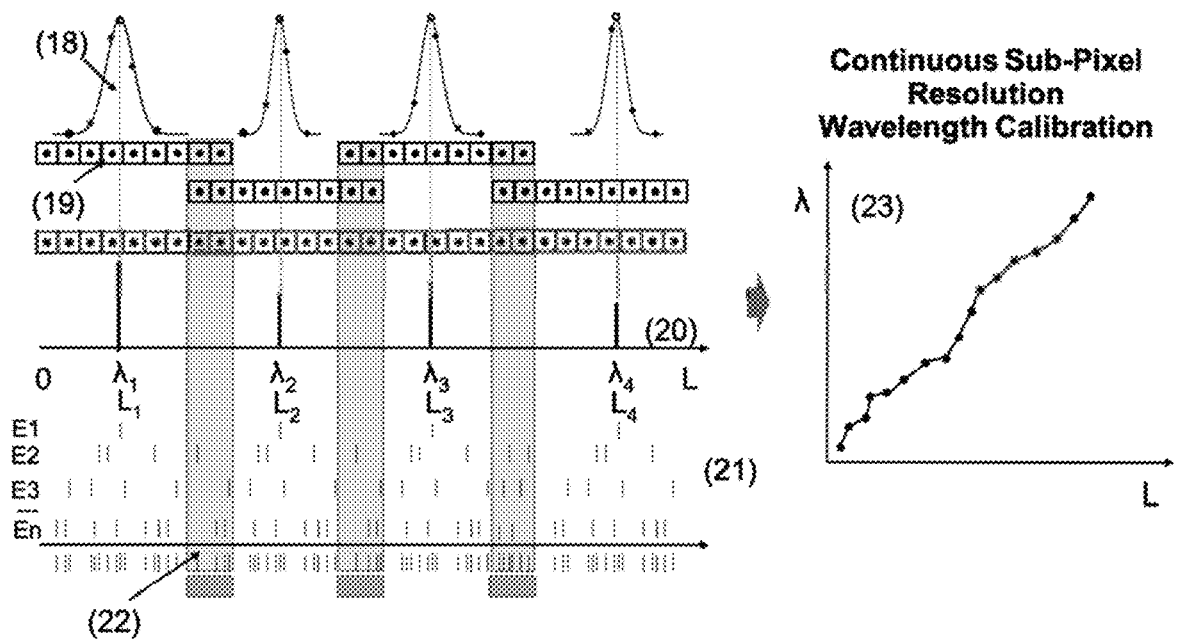
FIG. 3 is a schematic representation of the continuous sub-optical CCD calibration step.

Reference is made to FIG. 3 to explain the sub-steps of the continuous sub-optical CCD calibration step: i) spectral lines (18) are extracted by sub-optical resolution using supervised deconvolution of pixel based CCD data (19); ii) a significant number of pure elements and molecule standards are used to determine their emission lines (20), for correspondence with each CCD length (21); and iii) merging the common CCD regions (22) by their common spectral lines and calculating the merged CCD length, to assign the global calibration function $\lambda \sim f(L)$ (23).

In such embodiment, continuous sub-optical CCD calibration is performed into three steps. A first step is the initial allocation of wavelengths using gas emission spectra—light emission from gas lamps such as Mercury (Mg, ~250 spectral lines, 200-1204 nm), Argon (Ar, ~490 spectral lines, 200-1204 nm), Krypton (Kr, 141 spectral lines, 200-1204 nm), Neon (Ne, 591 spectral lines, 200-1204 nm) and Xenon (Xe, 121 lines, 200-1204 nm)) are used to perform an initial allocation of spectral lines wavelengths to each CCD length. This initial step allows to better locate spectral lines in more complex element emission spectra, such as Iron (Fe, ~6678 Lines 200-1204 nm). As gas lamps present significantly lower number of spectral lines (18), mostly without any interference, this allows to obtain very low error in spectral lines extraction and corresponding wavelength allocation to CCD lengths. The process follows by extracting the deconvoluted spectral line (18) by the extracted Point Spread Function (PSF) from the pixel-based data optimized against the expected theoretical SAHA/LTE (19) and performing the CCD length allocation (20) of each extracted spectral line. A first estimate of the continuous calibration is obtained by joining all spectral lines correspondences to the CCD length (21).

A second step is the wavelength allocation using pure sample elements—other pure, heavier elements, present significantly a higher number of emission spectral lines, where many of these, are overlapped due to spectral resolution and line broadening effects. For example, the ion Fe II has spectral lines at 200.31909 nm and 200.39104 nm, which distance 71.95 picometers, and therefore will appear super-imposed in the pixel-based spectra. As heavier elements have a significant number of spectral lines, they have higher probability of interference between two or more spectral lines. This interference can be estimated by supervised deconvolution using the theoretical peaks and their relative intensities, and spectral lines extracting the position by non-negative optimization/regression against the theoretically expected SAHA/LTE spectra. These two steps use the interference between spectral lines at different spectrometer resolutions to extract the correct position of the spectral lines in the CCD length, significantly reducing the continuous CCD wavelength calibration error by extracting spectral lines positions at sub-optical resolutions.

A third step, where the electromagnetic spectrum was obtained from a LIBS device with several CCDs, is the merging multiple CCD wavelengths into one continuous CCD—merging the wavelength position of each CCD in a multiple CCD spectrometer system is possible after performing the continuous CCD calibration for each CCD. The method thereby determines the common wavelength interval and the common spectral lines wavelengths, which form the overlapping CCD pixel region (22). Once the overlapping correspondence between CCD lengths, given the common spectral lines, is established, the merged CCD length computed by removing the overlapping length. The final continuous sub-optical calibration (23) is obtained by performing the previous operations to cumulative pairs of CCDs. Merging the overlapping regions allows to greatly reduce the wavelength calibration error in this region, as gratings intensity and interferences provide less resolution and intensities in these overlapping regions.

Therefore, sub-optical continuous wavelength calibration solves high-uncertainty in the wavelength and consequently excessive amount of interference or in extreme cases, the nonexistence of exclusive spectral lines, presented by the state-of-the art sensor/pixel-based methods that methods only use average pixel value to determine the position/wavelength of the observed (O) spectral lines.

Figure 4:
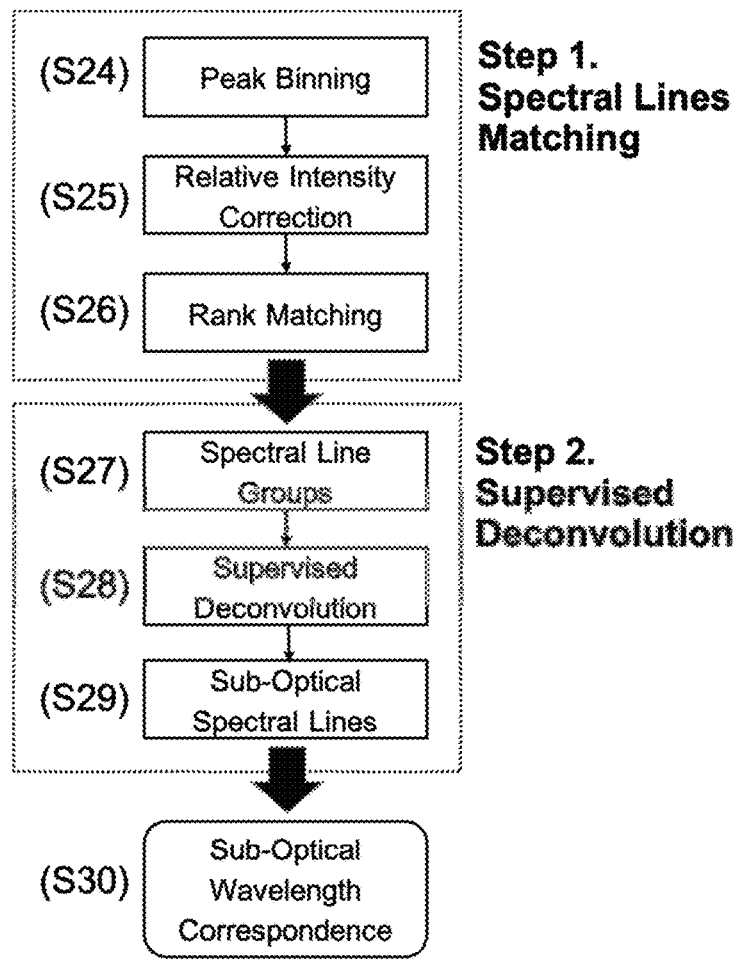
FIG. 4 presents an embodiment with the specific steps of the sub-optical continuous wavelength calibration (spectral line group extraction, deconvolution into spectral lines) for achieving sub-optical wavelength-CCD length correspondence.
Figure 5:
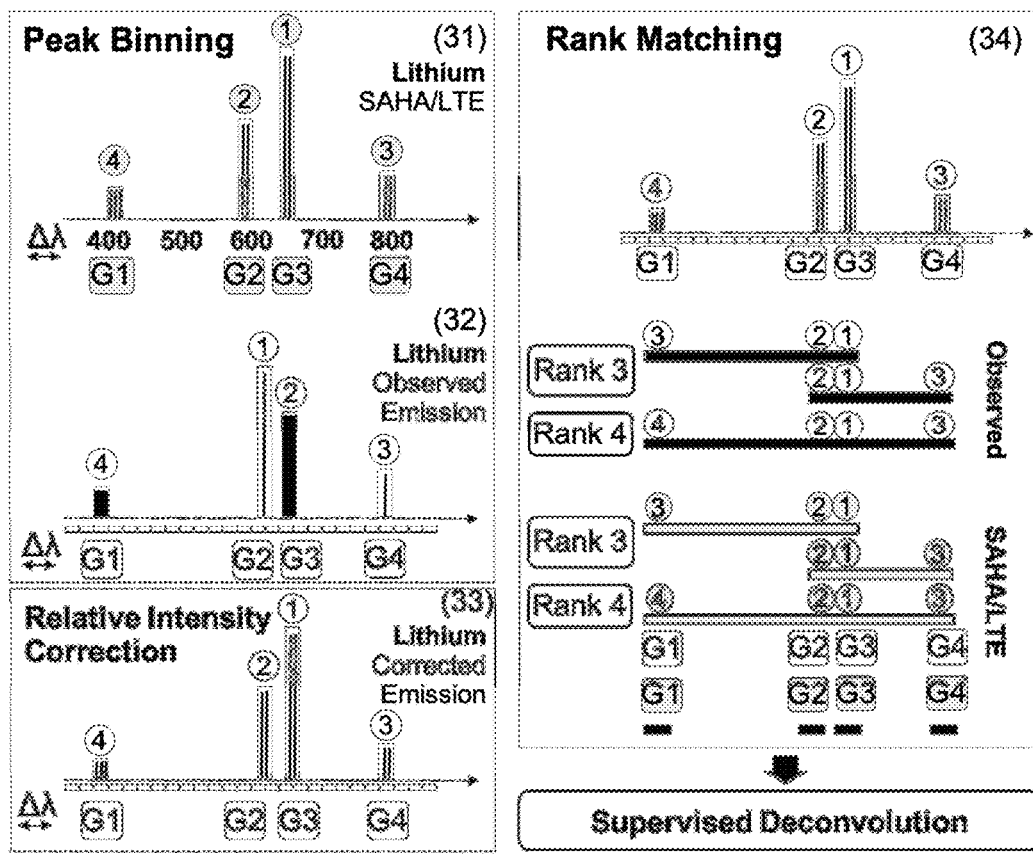
FIG. 5 illustrates an implementation of the specific embodiment of FIG. 4, with peak binning, relative intensity correction, and rank matching steps that are involved in spectral lines matching and constitute the initial steps of the sub-optical continuous wavelength calibration process.
Figure 6:
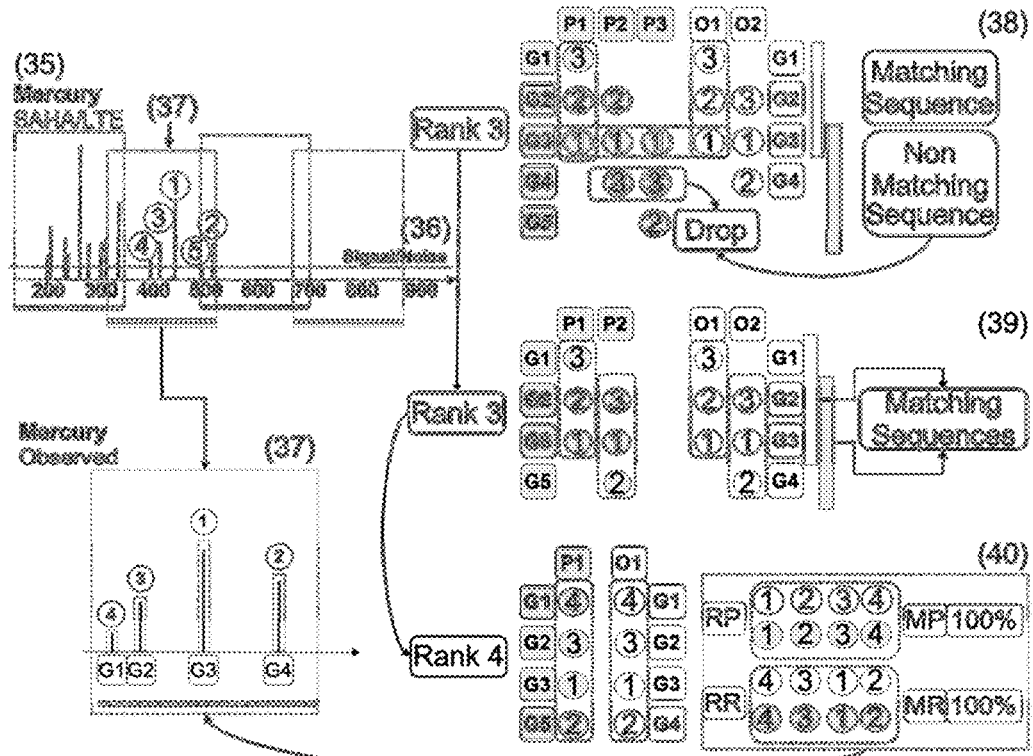
FIG. 6 presents how the binning, intensity correction, rank and matching methods steps deal with non-observed theoretical emission spectral lines with the particular example of mercury (Hg) emission spectra (35), where for a particular CCD (37) belonging to a multiple CCD system.
Figure 7:
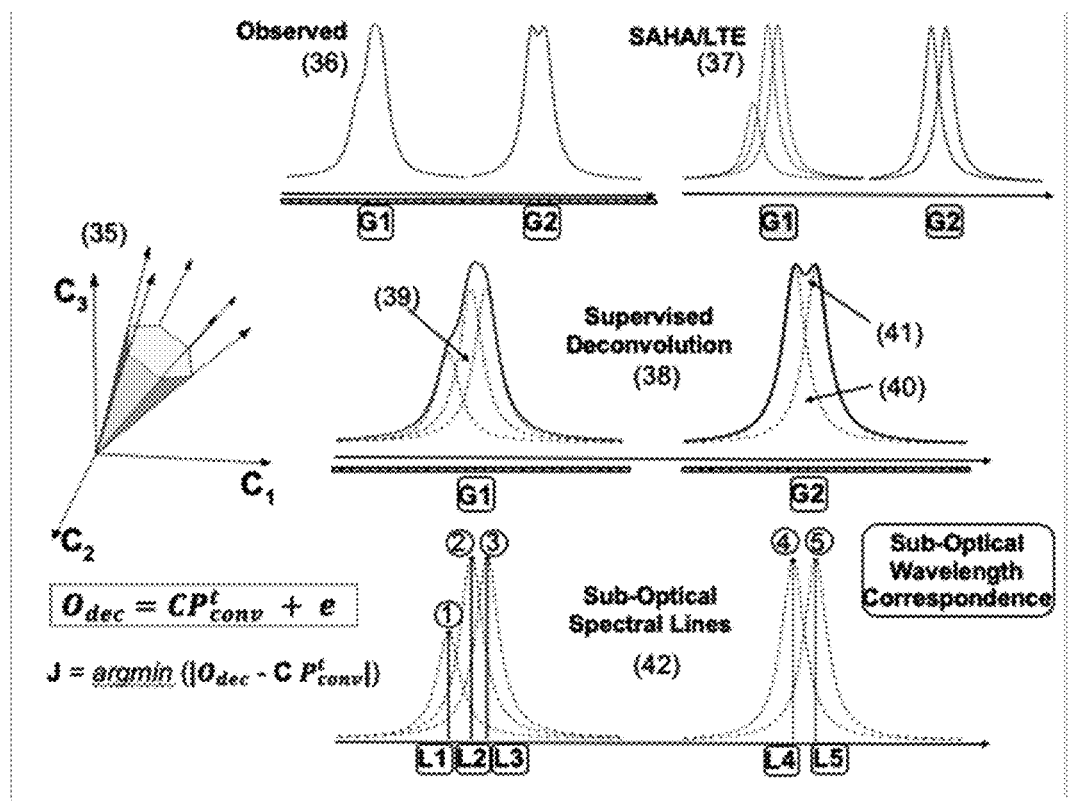
FIG. 7 is a schematic representation of the supervised deconvolution methodology using non-negative solution space, with extreme rays boundaries, that spawn and constrain the solution space to combinations of the deconvolution of the observable spectra (O), SAHA/LTE expected spectrum convolution (P) and corresponding spectral lines contributions (C) for the observable spectra. The illustrated procedure uses the matched groups (36) and SAHA/LTE (37) to supervise the deconvolution of the observed spectra bands (38) by optimizing at the same time the convolution of the expected SAHA/LTE spectra and observed spectra by j=argmin(|O-cst|) (38). The end result is the matching of the observed with the theoretically expected lines intensities and broadening effects (39), from where is possible to assign spectral lines to the CCD length with sub-optical accuracy.

Reference is made to FIG. 4 to present the steps of an embodiment for sub-optical continuous wavelength calibration, which are further detailed in FIGS. 5, 6 and 7. Such sub-optical continuous wavelength calibration aims at determining the sub-optical wavelength-CCD length correspondence by, firstly, optimizing spectral lines matching—where the observed and SAHA/LTE peaks are binned (S24) given a pre-determined wavelength ($\Delta\lambda$) and pixels ($\Delta px$) region of interest, determined by the FWHM of a highly coherent laser source (S24), performing intensity correction taking into account the number of lines of each group (S25), performing rank matching algorithm (S26) to identify consistent spectral lines between the observed spectra and theoretical spectral estimate; and, secondly, using supervised deconvolution where the matched groups (S27) between the observed and SAHA/LTE spectra are subjected to optimized deconvolution/convolution and super-imposed process (S28), where the SAHA/LTE is used as the theoretical expectation of the observation until the convergence to a minimum error (S29), allowing the sub-optical extraction of the observable spectral lines and establishing the corresponding relationship with the CCD length (S30). The said sub-optical resolution is so achieved using the theoretical SAHA/LTE spectral lines positions and uncertainties to match the observed spectra by such steps.

Such sub-optical continuous wavelength calibration thereby enables to determine the calibration function that relates the CCD length (L) to the wavelength of extracted line positions, solving the convolution imposed by the limited optical resolution and providing sub-optical resolution.

FIG. 5 presents in detail the steps of peak binning (S24), relative intensity correction (S25) and rank matching (S26). The wavelength along the CCD length is not possible to be directly estimated from grating functions with reliability, as manufacturing and assembly quality assurance cannot provide the required reproducibility of this hardware. In this reasoning, wavelengths throughout the CCD length are more accurately known by data-driven process of matching the theoretical wavelength (31) values against the observable lines (32) along the CCD length.

Peak binning (S24) comprises finding peak groups given a wavelength interval for the SAHA/LTE (theoretical) spectrum (31) and pixel interval for the observed spectra (32). Therefore, binning the spectral lines of the observed (O) and theoretical (P) within a given pixel or wavelength interval by distance clustering. The peak binning step (S24) begins by performing hierarchical clustering based in the Euclidean distance between the spectral peaks present in the theoretical SAHA/LTE (P) spectra (31) and the observed (O) spectra. The number of clusters is automatically optimized so that the number of groups to be ranked between O and P is similar through the rank matching step (S26). In the particular example of Lithium (Li) in FIG. 5, four groups are obtained in O (32) and P (31), respectively. It would be expected that all groups $G_P^{1-4}$ (31) and $G_O^{1-4}$ (32) have the same wavelength position and rank intensities but in this practical example relative intensities are inverted between $G_P^{2-3}$ (31) and $G_O^{2-3}$ (32). This interference is due to the limited resolution of CCD (pixel-based detection technology) that does not allow a determination of peak wavelengths as accurate as desired. To overcome this interference, a relative intensity correction (S25) step is performed.

Relative intensity correction (S25) is performed by ensuring the correct amount of energy is being compared between $G_P^{2-3}$ and $G_O^{2-3}$ groups along the pixels of the corresponding CCD interval. Relative intensities of spectral lines and groups may not directly match due to pixel assignment of convoluted and super-imposed light energy, such issue being better addressed by correcting the energy per spectral line given the number of spectral lines convoluted within a group divide the energy by pixel or in the case of being in one pixel, as the energy is accumulated.

Intensity corrections are performed to the binned groups from the observed spectra (32), taken into consideration the expected intensities from SAHA/LTE (theoretical) (31). The relative intensity correction process (S25) to obtain an intensity corrected spectrum (33) is as follows: determine the number of theoretical lines inside a particular group; and if lines are centred in one or more pixels, divide the corresponding energy between the number of theoretical peaks; or if the lines are convoluted along a number of pixels, determine the total energy using the following equation $E(p) = \int_P I(p)dp$, and divide by the number of expected number of theoretical lines. This step allows to perform more correct grouping of lines, so that supervised deconvolution can recover spectral information that is restricted in state-of-the-art due to the convolution imposed by the limited resolution of CCD.

In this particular example, Li lines with the corresponding wavelengths 610.354 nm and 610.365 nm are convoluted into one single pixel. Performing the relative intensity correction (33) is further analysed to adjust the wavelength interval of each identified group in the rank matching step (34).

The rank matching step (S26, 34) evaluates the intensity and position ranks for each of the previous groups in k size sequences ($3 \leq k \leq n$) until the full-length size n is reached (the number of binned lines groups), matched between groups of the observed spectra $G_O$ and theoretical spectra $G_P$. Non-consistent rank groups, that is, that do not match in position and intensity are dropped to achieve a very high match (up to 100%) in the full spectra between $G_O$ and $G_P$.

Rank Matching (34) is performed by making [n−k] rank search sequences, sorting groups by their intensities, where n is the number of groups, and k is between 3 and n. The rank search stops once a global rank match is established (k=n). Therefore, rank matching (34) is the process by which the position of the groups and their relative intensities are related ($G_P \leftrightarrow G_O$), for assignment of a particular observable group to a given theoretical wavelength interval:

$$MT = MP + MR$$

where $M_T$ is the global match, $M_P$ is the group position match and MR is the group intensity rank match, which must have 100% match between O and P, ensuring full $G_P$ and $G_O$, correspondence. MP and MR are computed as follows:

$M_P$=[Number of groups in the correct position]/[Total number of groups]

$M_R$=[Number of groups with correct intensity rank]/[Total number of groups]

To better determine if the correspondence exist, a rank search is performed sequentially for all ranks, and diagonally for each rank level. The method begins to perform a k=3 search, where each k search moves forward one group comparison along the CCD length. For example, in the particular example of Li, two k=3 searches are necessary to compute $M_P + M_R$. Search that provide 100% match are used to compute the next rank search level, k=4; that in this particular case k=n. If 100% is obtained in the last level, the correspondence between groups is locked ($G_P \leftrightarrow G_O$) and the method can proceed to supervised deconvolution.

FIG. 6 presents peak binning, the relative intensity correction and the rank matching steps in samples with non-observed theoretical emission spectral lines. The emission spectra of mercury (Hg) (35) is used as example of another inventive aspect of the object of the present invention—dealing with unobserved spectral lines due to signal/noise ratio (36), which does not allow to observe all spectral lines in a particular CCD region (37). Moreover, some elements may not exhibit emission lines in particular regions of the spectrum, such as Hg in the VIS-NIR region (35), not being shown in multiple CCDs devices. Another particularity in multiple CCD devices arises from the grating function in multiple CCD devices. Gratings are optimized to maximize signal intensity of the mid-range of the CCD pixels, and generally hold lower intensities at both ends of the CCD, which may be a significant limitation of these systems with higher errors in wavelength and lower intensities/sensitivity.

The present embodiment minimizes the loss of information of the overlapping regions by seeking to maximize all groups' correspondences in the signal/noise threshold (36). In most cases, theoretical lines with less intensity may not be observable in these regions. In this example, only four out of five groups of spectral lines from theoretical emission lines are observable. The algorithm identifies by rank match indexes what theoretical group is not observable, and which spectral line groups can be paired between theoretical and observable, that provide 100% match index in CCD length position and ranking.

Furthermore, two other concepts are used: i) correlation filtering; and ii) dropping non-observed groups. Correlation filtering determines the Spearman and Pearson correlation coefficient between $G_O$ and $G_P$, and only highly correlated groups are subjected to intensity corrections. After intensity correction, groups that are within $G_P \leftrightarrow G_O$ correlation, are used in the rank matching process. Non-correlated groups or non-matching sequences are filtered out (dropped). The method proceeds with dropping non-observed spectral lines groups. This process is illustrated in FIG. 6, beginning with k=3 for Hg in CCD2. In this range, five groups ($G_P{}^1$ to $G_P{}^5$) are present in theoretical spectral lines P but the observable spectrum has only four groups ($G_O{}^1$ to $G_O{}^4$) (38), at least one of the groups must be dropped to determine the $G_P \leftrightarrow G_O$ relationship.

The embodiment of the method proceeds as follows:
perform rank k=3 search between $G_P$ and $G_O$ (38);
determine the full match sequences and lock the groups that exhibit full match;
drop work rank group(s);
re-calculate ranks at k=3 until $M_P$ and MR are 100% (39); and
increase k+1 and repeat steps i-iv until n=k with $M_P$ and $M_R$ are 100% (40).

The presented steps of peak binning, relative intensity correction and rank matching ensure that only groups of emission lines that have consistency in wavelength position and intensities are used for supervised deconvolution. In this sense, only validated observable groups of spectral lines that are convoluted are used for the process of deconvolution to extract the exact position of the emission line in the CCD. Consistent groups in position and relative intensities from $G_P$ are now a match to $G_O$, and therefore the position in wavelengths and relative intensities can now be used to supervise the deconvolution process.

As previously referred, resolution is lowered by the convolution of the observable spectra (O) by: optical components (lenses, slit and grating), natural broadening; thermal effects, Doppler effect, collisional broadening, where:

$$O(\lambda) = H * \delta(\lambda_i) + S$$

where the observer emission line $O(\lambda)$ is the convolution of the spectral line Dirac delta $\delta(\lambda_i)$ with the effects function H, and super-imposed with other convoluted spectral lines S. Obtaining the exact location P of the spectral line $\delta(\lambda_i)$, is an objective of supervised deconvolution, where H is given by:

$$H(\lambda, \sigma, \gamma) = \int_{-\infty}^{+\infty} G(\lambda, \theta) \square L(\lambda, \gamma) d\lambda$$

where:

$$G(\lambda, \sigma) = \frac{1}{\sigma\sqrt{2\pi}} \exp\left(-\frac{\lambda^2}{2\sigma^2}\right)$$

and $$L(\lambda, \gamma) = \frac{\gamma/\pi}{\lambda^2 + \gamma^2}$$

where the Voigst profile H can be computed by the different influences of gratings, slits and Doppler broadening that lead to Gaussian (G) broadening profile, and natural broadening and collisional broadening to Lorentzian (L) profile. By manipulating $\sigma$ and $\gamma$, the most important effect can be included and corrected by supervised deconvolution.

Deconvolution is traditionally performed in the Fourier domain:

$$\delta(\lambda_i) = F^{-1}\{F(O)/F(H)\}$$

with smoothing to avoid errors near the signal-noise threshold and dividing by zero. Iterative methods are more immune to noise, and widely applied in spectroscopy (e.g. Riley, Van Cittert, Gold, Richardson-Lucy). These need a significant number of iterations to converge into a physically significant result, which must be verified against a theoretical result. In most cases, deconvolution is used empirically without theoretical confirmation, which does not allow to diagnose the statistical and physical validity of this spectroscopy pre-processing step.

In this reasoning, supervised deconvolution main objective is to optimize the convolution function H parameters $\sigma$ and $\gamma$, number of iterations and exponential boosting, so that, the deconvolution is in accordance to theoretically expected emission lines, and the position of the observed emission lines at the CCD length can be determined with sub-optical accuracy.

FIG. 7 presents the concepts of supervised deconvolution step, in an embodiment of the calibration method of the present invention, where the position of the theoretical spectral lines are estimated by deconvolution of the original signal (O) and convolution the SAHA/LTE lines (P) for a particular group of lines ($G_P \leftrightarrow G_O$) by non-negative optimization of $j = \mathrm{argmin}(|O_{dec} - CP_{conv}{}^t|)$, where C is non-negative super-imposed mixture matrix, and O is deconvoluted (thereby obtaining $O_{dec}$, as previously referred) and P is convoluted (thereby obtaining $P_{conv}$, also as previously referred) accordingly using the Voigst profile as the point-spread-function (PSF). FIG. 7 illustrates how to match two observed groups ($G_O$) (7.36) and theoretical SAHA/LTE groups ($G_P$) (7.37). The observable (O) spectra (7.36) can be regarded as the convolution of optical components and super-position of the SAHA/LTE plus uncertainties. Therefore, the exact wavelength position of the spectral lines $\delta(\Delta_i)$ is reliably estimated by a supervised deconvolution process that matches the convolution and superposition of theoretical spectra by the following non-negative optimization:

$$j = \mathrm{argmin}([O_{dec} - CP_{conv}{}^t]^2)$$

where $O_{dec}$, C and P are always non-negative, and C is the super-position vector. In order to ensure non-negativity, C vector solution space is confined to a convex hull cone (7.35), to which the boundaries are confined by the expected theoretical intensity relationships between spectral lines within a particular group ($G_P \leftrightarrow G_O$). Supervised deconvolution ensures that intensities and lines positions are correctly balanced (7.39, 7.40, 7.41), so that, their position along the CCD length is determined with significant sub-optical accuracy (7.42).

Supervised deconvolution provides the deconvolution of the observable spectra to optimize the position and intensities of spectral lines, between O and P, where both similarity between $O_{dec}$ and P ($E_0 = \Sigma[O_{dec} - CP_{conv}]^2/n_l$) and position invariance ($E_P = \Sigma[P^i - p^{i+1}]^2/n_l$) are optimal criteria. The algorithm begins to spawn the initial combinations of H($\Delta$, $\sigma, \gamma$), number of convolutions, and boosting factor, and initial super-position vector. Within each combination, optimization is performed by the following steps:

Deconvolution of the observable spectra: performing deconvolution with n boosted iteration until a new $O^{i+1}$ is obtained;

Theoretical spectra generation: generate the theoretical SAHA/LTE using spread function and super-position vector Sub-optical spectral lines position determination: non-negative optimization of $j=\mathrm{argmin}([O_{dec}-CP_{conv}']^2)$, where optimized C is non-negative and spectral lines position P is warped to determine the best optimal position of each line at the CCD length.

The algorithm repeats for a new non-negative search, adding a new combination search until the threshold criteria for $E_0$ and $E_P$ are obtained. The algorithm resolves the position P of the spectral lines groups in the observable spectra, being possible to the assignment of spectral lines theoretical wavelengths to the CCD length. Sub-optical spectral lines (29) are obtained the peak of the optimized corresponding PSF.

Another inventive aspect of the invention is the process of sub-optical spectral lines extraction for unknown complex samples. When complex samples with unknown composition are subjected to peak binning, grouping and supervised deconvolution, they need to be supervised by samples that provide high similarity of features, that is, spectral groups and theoretical spectral lines from a significant number of elements must be used to accurately extract the position of the expected emission lines. Therefore, the steps of spectral lines grouping and supervised deconvolution can be accurately used once a similar sample in the feature space is used to supervise the deconvolution. Two different approaches are used: SAHA/LTE feature space simulation—the SAHA/LTE equations are used to create a theoretical spectra (P) feature-space corresponding to a plurality of complex compositions of constituents to supervise the deconvolution; and data driven feature space—where compositional information about the sample (γ) and corresponding spectra (O) are experimentally obtained to create the feature space (F) and correspondent expected theoretical spectra (P). For any of these options, once unknown samples are recorded, binning, matching and supervised deconvolution proceeds as follows:

project the unknown sample spectra into the feature-space F;

determine the most similar sample from a cluster group;

determine the corresponding constituents;

compute or obtain the theoretical spectra (P) from SAHA/LTE equations; and use the O and P as input into step ii) of the calibration method of the present invention for binning, matching and supervised deconvolution.

Figure 8:
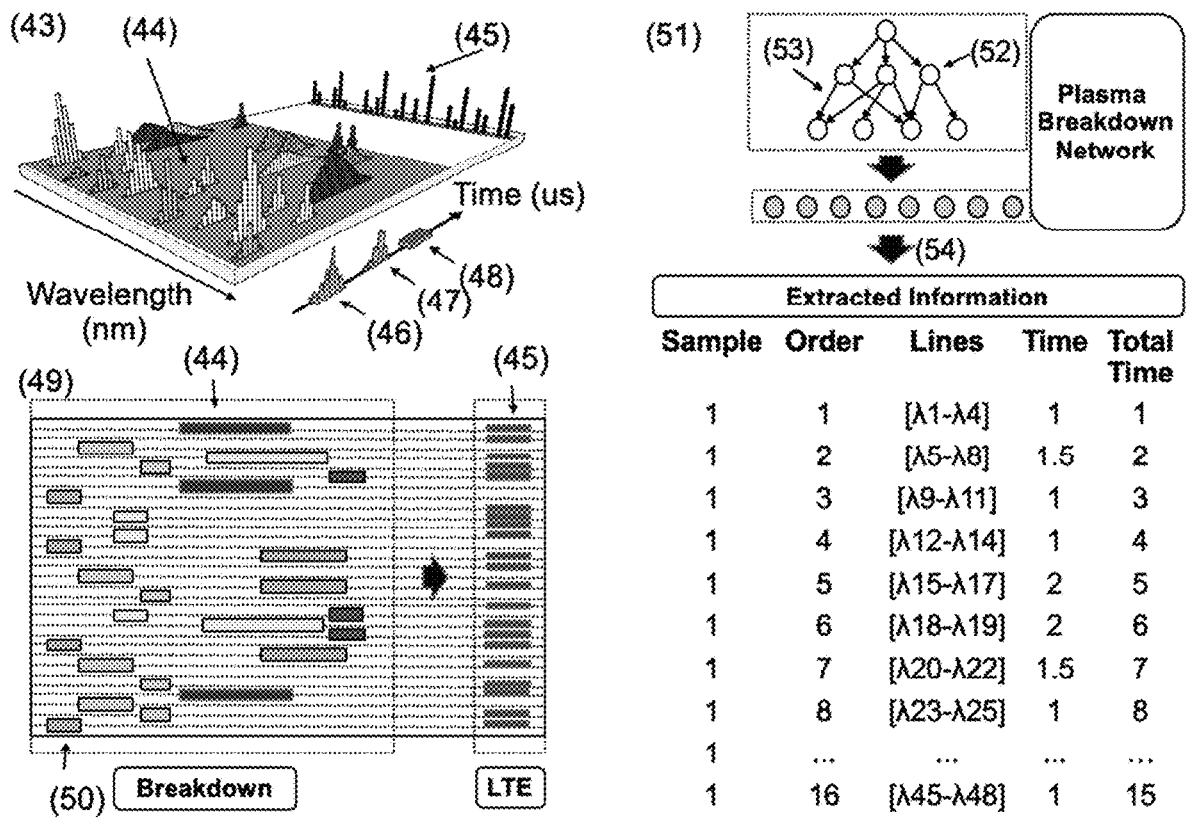
FIG. 8 consists of an illustrative representation presenting the main steps for dynamic/LTE database construction.

FIG. 8 presents the steps for dynamic database construction, in an embodiment of the calibration method of the present invention, where the dynamic plasma-emission breakdown process is recorded from ablation to the LTE (43). Dynamical information is extracted for each time step (44) and LTE (45), extracting sub-optical spectral lines by the same previously described steps of binning, matching and supervised deconvolution. Time-course correlated lines (46) are extracted (47), leading to the existence of consistent time-course regions of interest (ROI) (48) that correspond to the time of life of specific molecular breakdown ions. Once all molecular bonds are broken, the LTE spectra is observable (45). Such involves the extraction of each line (46) and correspond life time (47) and the definition of region of interest (ROI) (48). ROI's that have synchronized life times, belong to the same constituent, and therefore, a map of ROI's can be constructed (49) that takes into consideration the breakdown process (44) and LTE (45) for each sample, where ion emission lines are extracted by ROI's synchronization (50).

Extracted ROI's compose the ROI sample map (49), a specific dynamical sample fingerprint of the breakdown process, from where information about specific breakdown ions is extracted (51): specific lines and time of life, sequential breakdown network (52) and corresponding kinetics (53) until the LTE. Automatically extracted dynamic and LTE spectral sub-optical lines and information is stored in a high dimensional tensor. The ROI map provides information to determine the plasma-breakdown network (PBN) (51). PBN is generated from the temporal sequence of ion emission lines, to which each ion correspond to a node of the network. Each ion is formed by a specific plasma breakdown reaction (53). The kinetic information and time of life of each ion, provides information about the molecular structures present in each sample, as well as, composition, until the LTE is reached and only emission lines from atomic ions are observable (54).

The extracted information is organized into the multi-dimensional tensor format (samples, time, wavelengths) (43). Each sample is represented by the extracted sub-optical lines throughout time until the LTE. Tensor database (samples, time, wavelength), where each sample has corresponding associated information about the breakdown network. Furthermore, the final step determines each constituent the information about spectral lines global and local exclusivity, interference and uniqueness. Furthermore, each recognized ion constituent has associated the following information ions and extracted lines with corresponding time of life, kinetics and breakdown network for each sample. Moreover, extracted lines are classified as:

exclusive: spectral lines that at a given spectral resolution are exclusive of a particular ion, and therefore provide a deterministic identification. Spectral lines can also have context exclusivity, that is, for are exclusive for a given sub-group or class;

interference: spectral lines that are unresolved between constituents, holding information on the interference patterns that can be used for quantification and classification;

unique: spectral lines that are exclusive in the context of the breakdown process, and provide a direct identification of the molecular structure. As exclusivity, uniqueness can also be restricted to a particular class or sub-group.

Another object of the invention relates to the capacity to transfer information between different spectrometer systems without the use of standardization, removing the current disadvantages of the need for a master spectroscopy system, sample standards or re-calibration. Information transfer between different observations are dominated by optical effects of components such as slit, grating and CCD, laser energy and pulse function; and samples diversity. Optical components generate distortions to the same spectral information, so that, the observed signal is unique to a particular device, despite spectral information is the same. Therefore, information transfer can be regarded as a correction between feature-space distortions of different devices.

Continuous CCD calibration enables the direct transfer of wavelength positions in the CCD between different spectrometers (12), as follows:

$$\lambda_{CCD1}=f(L_1,\lambda)$$

$$\lambda_{CCD2}=f(L_2,\lambda)$$

from where, the direct relationship is established: $\lambda \rightarrow (L_1, L_2)$ (13).

Figure 9:
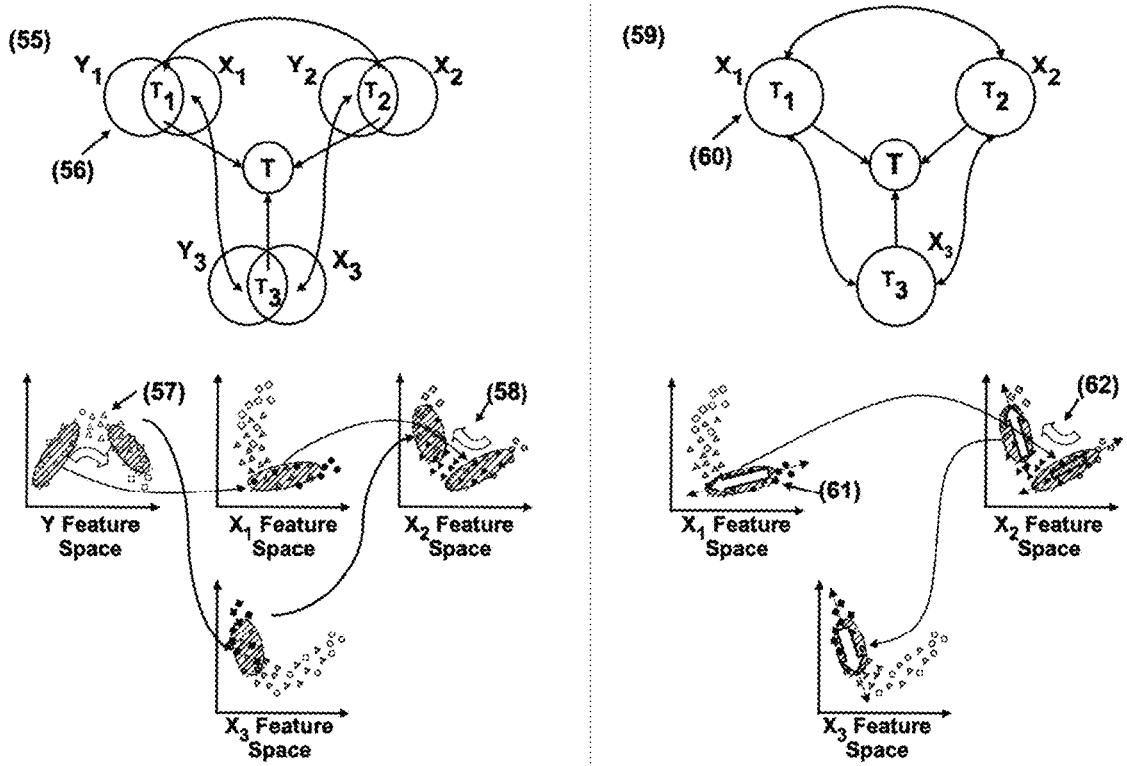
FIG. 9 is a schematic and illustrative representation of supervised (55) and unsupervised (59) sub-optical spectral information transfer. Supervised spectral information transfer, uses the constituents quantification (Y) obtained by standard laboratory methodologies and spectral data (X), obtained by different apparatuses, forming individual pairwise databases of n independent apparatuses: $[Y_1 X_1] [Y_2 X_2] [Y_3 X_3] \ldots [Y_n X_n]$ (56). In the supervised step, the Y feature-space is known, and therefore, direct spectral-features supervision is possible between each feature space of $X_1, X_2, X_3 \ldots X_n$ (57). The unsupervised step (59) makes use of only spectral information properties in the feature-space of $X_1, X_2, X_3 \ldots X_n$, that must retain the same co-variance between samples within feature space regions (S61). In the supervised step, each device maximizes the spectral features co-variance against the constituent composition, so that, each device has its own corresponding feature-space $T_1, T_2, T_3 \ldots T_n$. This information can be exchanged between devices in two distinct ways.

As depicted in FIG. 9, spectral information transfer may be performed by supervised (55) and unsupervised (59) steps. The main advantages of this new technology are:

Independently recorded spectra and constituent composition can be regarded as an individual database $[X_1/L_1,Y_1]$, $[X_2/L_2, Y_2]$, $[X_3/L_3,Y_3]$ ... $[X_n/L_n,Y_n]$, where X is observed spectral data, L dynamic tensors, and Y the constituents/sample composition assumed as ground truth. Data of each database is not reliably transferable between apparatuses, and must be corrected between each $X_1, X_2, X_3 \ldots X$, or $L_1, L_2, L_3 \ldots L_n$.

Standardization uses the same samples across different devices, enforcing the same information in Y, X or L. No matter the differences in the observable signal $X_i$ or $L_i$, the information about constituents is equivalent. The same is valid for similar Y's, $Y_1 \sim Y_2 \sim Y_3 \ldots Y_n$, and $X_1 \sim X_2 \sim X_3 \ldots \sim X_n$, which also provide equivalent information about concentration co-variance, despite optical artefacts that make each one of the observations unique.

Spectral distortions can be regarded as rotational warping of the feature space, as presented in FIG. 9. Both X or L and Y can be subjected to a base transformation (e.g. kernel, Fourier, wavelets, curvelets, eigenvectors or other basis, that can be made orthonormal), to provide the corresponding feature-spaces F and K, respectively. F and K are chosen so that constituents' quantification features (U) has a corresponding information in the spectral feature-space (T), $T \rightarrow U$:

$$j(w,c)=\mathrm{argmax}(t^t u)$$

where $F=TW^t$ and $K=UC^t$. which if they carry the same information T=U, meaning that F and K hold the same information geometry or eigenstructure.

In this reasoning, any device feature-space T resulting from the observed features F, must hold the same information about K, despite the different devices have unique observations (O). Information between spectral features are transferable between the different $T_1, T_2, T_3 \ldots T_n$ spaces, supervised by Y.

FIG. 9 presents additional features for supervised spectral information transfer (55). In this particular example, three independent spectroscopy devices have their own unique databases, with corresponding constituents composition Y and the observed spectral data X (56): $[X_1,Y_1]$, $[X_2,Y_2]$, $[X_3,Y_3]$. Each independent device is capable of establishing the following relationships within a local geometry of the feature space:

$$F_i=T_i P^t_i+T_{o,i}P^t_{o,i}$$

$$K_i=T_i Q^t_i+U_{o,i}Q^t_{o,i}$$

where $T_i$ is the co-variance feature space, $P^t_i$ and $Q^t_i$ the corresponding $F_i$ and $K_i$ co-variance basis, $T_{o,i}$ and $U_{o,i}$ the orthonormal information to $F_i$ and $K_i$, with $P^t_{o,i}$ and $Q^t_{o,i}$ basis. Only T holds common information between Y and X/L, being the transferable information. FIG. 10. is presented as auxiliary to provide the necessary steps of supervised spectral information transfer. Information transfer can be regarded as a correction between feature spaces T of different devices, within shared information or local regions/geometries of the said feature-space T (57).

Supervised information transfer between two independent devices i and j that share a region of the feature-space, is performed by the following steps that convert the information of i in j:

assembling the constituents composition space (Y) (S63): concatenate the constituents databases $Y_i$ and $Y_j$ into Y ($Y \leftarrow [Y_i, Y_j]$);

determine the common feature region (S64): information transfer can only be performed between regions with common information of K. In this sense, the clustering of samples in K space is performed to supervise the samples that belong to a common region (57);

determine the initial $T^o_{i \rightarrow j}$ (S65) coordinates by direct projection in the $T_j$ feature space, $T^o_{i \rightarrow j}=Y_i Q(Q^t Q)^{-1}$;

coordinate warping (S66): warp $T_i$ position in $T_j$, so that is maximizes the co-variance $F^t K$, $j=\mathrm{argmax}(t^t u)$ (S67). For each iteration of $T_{i+1}$ in $T_j$ space, the estimated spectra $X_{i+1}$ is computed at device J, by taking into account the orthogonal information to K, $T_{o,i}$ that must also be determined, so that:

$$F_{i+1}=T_{i+1}P^t_i+T_{o,i+1}P^t_{o,i}$$

$$Kp_{i+1}=T_{i+1}Q^t_i+U_{o,+1i}Q^t_{o,i}$$

where $F_{i+1}$ is the estimated spectral feature that predicts $Kp_{i+1}$ the warping step is performed until the prediction error is below a given threshold (S68): $e_i=\Sigma[Kp-K]^2$;

reconstruction of the initial Spectra $X_i$ in $X_j$, by inverse feature transformation $F \rightarrow X$ (especial case when F=X, no transformation is necessary).

Given the previous steps, spectral information is reliably transferable between two apparatuses/devices i and j, and both constituent composition and estimated spectra be added to the j device, where $[Y_i,X_i]$ is transferable to the database $[Y_{j+i},X_{j+i}]$. The same can be extended to any pair of devices in the network that share a region of the K feature space. Therefore, for any given new spectra is only know to device i, can now be used by device j, to predict the constituents composition.

These steps can also be performed by a chain rule (58) to sequentially covering the feature space by different devices where information can be sequentially transferred along the network to devices that never had access to similar samples. If information from i fully transferred to j, and k has no knowledge of i, but has of j, $i \rightarrow j$ transferred information is available to k.

Relevant aspects of unsupervised information transfer are presented in FIG. 9 (59). Unsupervised uses only observed spectral information X and its structure to transfer information between different devices. Devices only register in databases their independent spectra $[X_1]$, $[X_2]$, $[X_3]$, and therefore spectral information cannot be reliably transferred with constituent composition supervision. This aspect of the invention is highly relevant for exploration, when there is no availability to supervise the system using reference ground truth methods for sample constituents identification and quantification.

Unsupervised spectral transfer is supported by two main characteristics: i) the feature-space of pure elements is known, as these were previously used to performing sub-optical calibration; and ii) spectral information transfer is performed by analysing the coordinates in the feature space and co-variance direction of constituents quantification, that must be preserved when transferred between i and j apparatuses/devices (S60).

FIG. 10. provides auxiliary information about the main steps of unsupervised spectral information transfer:

pure elements feature-space information transfer (S71): transferring information of pure elements between devices i and j is performed by the same steps of supervised information transfer (S63-S70), where constituents' composition Y is given by pure elements incidence matrix, projecting unknown samples into pure elements spaces (S72): project the spectra of device i into the pure elements space of j, $T_j$, given by the exclusive spectral lines of observed elements in i and j, co-variance direction determination (S73) and relative position at co-variance direction (S74): to fine tune the sampling of $X_i$ and $X_j$ that can be used in the $T_{i \to j}$ projection, warping $T_{i \to j}$ projection (S75): using the initial relative position, find the optimal position of $T_{i \to j}$ by warping along the co-variance direction, so that, rank is correctly ordered, and covariance between $T_{i \to j}$ and $T_j$ direction is maximized between i and j samples. Perform the warping of $T_{i \to j}$ until the covariance is maximized, that is, a stable rank is predicted with $[T_{i \to j}, T_j]$ (S76), estimate the observable spectra by $X_{i \to j} = T_{i \to j} P^t$ (S77).

From this steps, any new unknown spectra that is projected into this region the spectral feature space, can be directly and reliably compared to other samples, to rank the content in constituents and provide similarity metrics with known samples (S78).

As will be clear to one skilled in the art, the present invention should not be limited to the embodiments described herein, and a number of changes are possible which remain within the scope of the present invention.

Of course, the preferred embodiments shown above are combinable, in the different possible forms, being herein avoided the repetition all such combinations.

REFERENCES

Kramida, A., Ralchenko, Yu., Reader, J. and NIST ASD Team (2018). NIST Atomic Spectra Database (version 5.5.6), [Online]. Available: https://physics.nist.gov/asd [Tue May 29, 2018]. National Institute of Standards and Technology, Gaithersburg, MD.

D. W. Hahn and Omenetto N. Laser-induced breakdown spectroscopy (libs), part i: review of basic diagnostics and plasma-particle interactions: still-challenging issues within the analytical plasma community. Appl Spectrosc., 64(12):335-66, 2010.

A. Cousin, O. Forni, S. Maurice, O. Gasnault, C. Fabre, V. Sautterd, R. C. Wiense, and J. Mazoyera. Feasibility of generating a useful laser-induced breakdown spectroscopy plasma on rocks at high pressure: preliminary study for a Venus mission. Spectrochim. Acta Part B, 59:987-999, 2011.

The invention claimed is:

1. A calibration method of a spectroscopy device comprising a plurality of sensors characterised in that the calibration method comprises the steps of:
   i) obtaining a high-resolution electromagnetic spectrum of a physical sample, the electromagnetic spectrum being obtained by means of the plurality of sensors of the spectroscopy device,
   ii) obtaining, by determining peak groups of the electromagnetic spectrum within a wavelength interval from a plurality of predefined wavelength intervals, and matching each peak group with at least one theoretical spectral line within such interval, at least one spectral line group (O) from the electromagnetic spectrum, a spectral line group containing at least one spectral line,
   iii) optimising a deconvolution of each obtained spectral line group against at least one theoretical electromagnetic spectrum, and thereby extracting at least one spectral line from each spectral line group, in particular obtaining a wavelength associated to each extracted spectral line, the optimisation being performed until convergence of each spectral line group (O) with an at least one spectral line of a theoretical spectrum (P), with a predefined minimum error,
   iv) assigning each obtained wavelength to one or more sensors of the plurality of sensors of the spectroscopy device, and thereby corresponding each wavelength to a wavelength position in the whole sensor length, the sensor length being defined by the plurality of sensors, and
   v) from the correspondence of each wavelength to a wavelength position in the sensor length, determining a calibration function of the spectroscopy device, wherein obtaining at least one spectral line under step ii) comprises:
   a) binning each peak group of the electromagnetic spectrum, a peak group containing at least one peak, by determining peak groups of the electromagnetic spectrum within a wavelength interval from a plurality of predefined wavelength intervals and by comparing peak groups within such predefined wavelength intervals with spectral lines of a theoretical spectrum, wherein the number of peak groups of the electromagnetic spectrum and of the theoretical spectrum are the same,
   b) correcting the relative intensity of each binned peak group and defining a rank of each peak group according to a corresponding corrected intensity, said correction being performed by comparison with the intensities of corresponding theoretical spectral lines, and
   c) matching the rank of each peak group, by iteratively assigning a wavelength position of a peak group and corresponding a corrected intensity with at least one theoretical spectral line within such interval, and thereby obtaining one or more spectral line groups.

2. A calibration method according to claim 1 wherein the peak binning of step a) specifically comprises performing wavelength distance clustering between the obtained peak groups and corresponding theoretical spectral lines, thereby determining peak groups of the electromagnetic spectrum within a wavelength interval.

3. A calibration method according to claim 1 wherein the comparison with the intensities of corresponding theoretical spectral lines of step b) specifically comprises:
   determine the number of spectral lines of the theoretical electromagnetic spectrum inside a peak group of the obtained electromagnetic spectrum, and
   if such peak group is centred in one or more sensors of the spectroscopy device, divide the energy of such peak group between the number of spectral lines of the theoretical electromagnetic spectrum, or, alternatively,
   if the peak group is convoluted along more than one sensor, determine the total energy of the peak group in such sensors and divide such total energy by the number of convoluted theoretical spectral lines, thereby correcting the relative intensity of obtained peak groups based on the corresponding theoretical spectral lines and/or wherein the rank matching of step c) specifically comprises:

performing SS=n–k rank search sequences (SS), n consisting of the number of peak groups and k being an integer between 3 and n, with matching between peak groups of the obtained electromagnetic spectrum and spectral lines of the theoretical electromagnetic spectrum, sorting peak groups by their intensities until a global rank match is established, the global rank match being established when a full length is reached, thereby obtaining one or more spectral line groups and where a peak group does not match in wavelength position and intensity with a spectral line of the theoretical spectrum, discarding such peak group, thereby providing a complete match between peak groups of the obtained electromagnetic spectrum and spectral lines of the theoretical electromagnetic spectrum.

4. A calibration method according to claim 1 wherein the deconvolution of step iii) comprises optimising the wavelength position and intensities of spectral lines within a spectral line group between each spectral line group and a theoretical electromagnetic spectrum, specifically by means of the optimisation of similarity and wavelength position invariance between each spectral line group and a theoretical electromagnetic spectrum and, such optimisation comprising the estimation of the wavelength position of theoretical spectral lines by deconvolution of the obtained electromagnetic spectrum (O) and convolution of the referred theoretical spectral lines (P) within a spectral line group, by non-negative optimization of:

$$j=\mathrm{argmin}(|O-CP^T|),$$

where C is a non-negative matrix which defines a convolution and superposition of spectral lines, $P^T$ consisting of the transposed of P, and O is deconvoluted—thereby obtaining a deconvoluted O ($O_{dec}$)—and P is convoluted—thereby obtaining a convoluted P ($P_{conv}$)—so optimized aiming a match between O and P, thereby extracting at least one spectral line.

5. A calibration method according to claim 1 wherein said electromagnetic spectrum consists of an electromagnetic spectrum obtained by:

a plasma inducing spectroscopy device comprising a Laser-induced Breakdown Spectroscopy (LIBS), the spectroscopy device thereby consisting of a LIBS device and the sensors of CCDs, Mass Spectroscopy (MS), the spectroscopy device thereby consisting of a MS device and the sensors of at least one MS detector, X-Ray Fluorescence (XRF), the spectroscopy device thereby consisting of an XRF device and the sensor of at least one XRF detector, or Nuclear Magnetic Resonance Spectroscopy (NMR), the spectroscopy device thereby consisting of an NMR device and the sensors of at least one NMR detector.

6. A calibration method according to claim 1 wherein prior to step ii), it further comprises the steps of:

project the obtained electromagnetic spectrum into a feature space F, the feature space F consisting of a multiple dimension vector space comprising spectral information on a plurality of physical samples, the spectral information comprising a one or more spectral lines having been extracted from a previously obtained electromagnetic spectrum and) corresponding to a plurality of known constituents, the spectral information on a plurality of physical samples being clustered in one or more groups in the feature space F, according to a predefined distance between such spectral information, determine a cluster group of the obtained electromagnetic spectrum and, in such cluster group, determine the spectral information most similar to the obtained electromagnetic spectrum, determine the known constituents corresponding to the most similar spectral information, obtain a theoretical electromagnetic spectrum from such determined constituents, define the obtained theoretical electromagnetic spectrum as the theoretical electromagnetic spectrum for steps ii) and iii).

7. A calibration method according to claim 1 wherein the electromagnetic spectrum was obtained from a spectroscopy device comprising at least two groups of sensors, the lengths of such at least two groups of sensors being merged after the assignment of step iv) and thereby obtaining a full sensor length, the said merge comprising:

re-ordering said at least two groups of sensors by their corresponding wavelength intervals;

determining at least one wavelength interval common to the at least two groups of sensors, as well as the corresponding spectral lines inside the said at least one common wavelength interval, and determining at least one wavelength interval which is not common to the at least two groups of sensors;

determining a relation between the lengths of the at least two groups of sensors by means of the said corresponding spectral lines directly, and merging two non-common wavelength intervals and said common wavelength interval, to obtain the full sensor length.

8. A calibration method according to claim 1 wherein the referred obtained electromagnetic spectrum consists of a plurality of obtained electromagnetic spectra, in particular a plurality of obtained electromagnetic spectra which correspond to a variation in time, for a certain time-lapse wherein the electromagnetic spectrum from which at least one spectral line group is obtained in step ii), and thereby from which spectral lines are deconvoluted in step iii), consists of each of the plurality of obtained electromagnetic spectra, each corresponding to a certain time-instant from said time-lapse, thereby steps ii) and iii) being performed for each electromagnetic spectrum corresponding to a certain time-instant from said time-lapse, the electromagnetic spectra being further obtained by a plasma inducing spectroscopy technique and the calibration method further comprising the following steps:

extracting spectral lines correlated with a specific time-instant from said time-lapse, from said extracted correlated spectral lines, determining regions of interest in said time lapse, each region of interest corresponding to a time interval from said time lapse, the time interval specifically containing at least one of the extracted correlated spectral lines and thereby corresponding to the time of life of specific molecular breakdown ions from the physical sample, from said regions of interest, defining a temporal sequence of extracted correlated spectral lines, defining each of said ions as a node of a dynamic spectral information network, such network being established as unique spectral information related to a specific constituent or plurality of constituents present in the physical sample, and storing such dynamic spectral information network and respective constituent or constituents in a database.

9. A computational apparatus for the calibration of a spectroscopy device comprising a plurality of sensors, wherein it is configured to implement the method of claim 1, optionally further comprising a spectroscopy device which:

is able to induce a plasma state in a physical sample, said spectral information being obtained from said spectroscopy device, the spectroscopy device consisting of a plasma inducing spectroscopy technique, a LIBS device, consists of an MS device, the sensors thereby consisting of at least one MS detector, consists of an XRF device, the sensors thereby consisting of at least one XRF detector, or consists of an NMR device, the sensors thereby consisting of at least one NMR detector.

10. A method for assembling at least one electromagnetic spectrum database comprising the steps of:

calibrating a spectroscopy device through a calibration method of a spectroscopy device comprising a plurality of sensors, wherein such calibration method in turn comprises the steps of:

i) obtaining a high-resolution electromagnetic spectrum of a physical sample, the electromagnetic spectrum being obtained by means of the plurality of sensors of the spectroscopy device, ii) obtaining, by determining peak groups of the electromagnetic spectrum within a wavelength interval from a plurality of predefined wavelength intervals, and matching each peak group with at least one theoretical spectral line within such interval, at least one spectral line group (O) from the electromagnetic spectrum, a spectral line group containing at least one spectral line, iii) optimising a deconvolution of each obtained spectral line group against at least one theoretical electromagnetic spectrum, and thereby extracting at least one spectral line from each spectral line group, in particular obtaining a wavelength associated to each extracted spectral line, the optimisation being performed until convergence of each spectral line group (O) with an at least one spectral line of a theoretical spectrum (P), with a predefined minimum error, iv) assigning each obtained wavelength to one or more sensors of the plurality of sensors of the spectroscopy device, and thereby corresponding each wavelength to a wavelength position in the whole sensor length, the sensor length being defined by the plurality of sensors, and v) from the correspondence of each wavelength to a wavelength position in the sensor length, determining a calibration function of the spectroscopy device, and wherein the said method for assembling at least one electromagnetic spectrum database further comprises the steps of:

obtaining an electromagnetic spectrum of a physical sample by means of the plurality of sensors of the calibrated spectroscopy device, obtaining at least one spectral line from the electromagnetic spectrum of the calibrated spectroscopy device and determining one or more constituents present in such physical sample, and storing such at least one spectral line obtained from the electromagnetic spectrum K and corresponding determined one or more constituents Y in said at least one electromagnetic spectrum database, thereby assembling an entry corresponding to a sample, wherein obtaining at least one spectral line under step ii) comprises:

a) binning each peak group of the electromagnetic spectrum, a peak group containing at least one peak, by determining peak groups of the electromagnetic spectrum within a wavelength interval from a plurality of predefined wavelength intervals and by comparing peak groups within such predefined wavelength intervals with spectral lines of a theoretical spectrum, wherein the number of peak groups of the electromagnetic spectrum and of the theoretical spectrum are the same, b) correcting the relative intensity of each binned peak group and defining a rank of each peak group according to a corresponding corrected intensity, said correction being performed by comparison with the intensities of corresponding theoretical spectral lines, and c) matching the rank of each peak group, by iteratively assigning a wavelength position of a peak group and corresponding a corrected intensity with at least one theoretical spectral line within such interval, and thereby obtaining one or more spectral line groups.

11. A method for transferring spectral information obtained from a first spectroscopy device i and at least a second spectroscopy device j, the method comprising the steps of:

assembling a first database with electromagnetic spectra obtained from the first spectroscopy device i, by means of the method of claim 10, assembling at least one second database with electromagnetic spectra obtained from the at least one second spectroscopy device j, by means of the method of claim 10, and concatenate a plurality of constituents $Y_i$ of the sample entries assembled in the first database with a plurality of constituents $Y_j$ of the sample entries assembled in the at least one second database, thereby obtaining a composition space Y, perform a base transformation in the composition Y and thereby obtain a feature space K, in which $K=UC^T$, U consisting of a vector of a feature space of constituents and C of a base vector of K in which U is not maximised, and perform a base transformation in a composition X consisting of spectral information corresponding to the concatenated composition Y and thereby obtain a feature space F, where $F=TW^T$, W consisting of a feature space of spectral information and W of a base vector of F in which W is not maximised, wherein $$K_i = T_i Q_i^T + U_{o,i} Q_{o,i}^T$$

in which $T_i$ is a covariance feature space, $Q^T_i$ consists of a co-variance basis vector, and $U_{o,i}$ consists of orthonormal information vector of $K_i$, with $Q_{o,i}^T$ basis, and $$F_i = T_i P_i^T + T_{o,i} P_{o,i}^T$$

in which $P^T_i$ consists of a co-variance basis vector, and $T_{o,i}$ consists of orthonormal information vector of $F_i$, with $P_{o,i}^T$ basis, determine at least one region of common features in K, thereby obtaining a one or more common feature regions, by means of clustering of sample entries in K, determine initial coordinates $T_{i \to j}^{0}$, by direct projection in the $T_j$ feature space, where $K_i = Q(Q^T Q)^{-1}$, coordinate warping by warping position $T_i$ in $T_j$, such that a co-variance $F^T K$ is maximised, until a prediction error is below a predefined threshold, therefrom reconstruct electromagnetic spectra $X_i$ in $X_j$, by means of inverse feature transformation of $F \to X$, thereby providing that any sample entry obtained by means of the first spectroscopy device is comparable with any sample entry obtained by means of the second spectroscopy device.

12. A network of computational apparatuses, each computational apparatus comprising a database and being configured to implement the method of claim 11, thereby assembling such database, for each computational apparatus, any sample entry obtained by means of a first spectroscopy device is comparable with any sample entry obtained by means of the second spectroscopy device.

* * * * *